(12) United States Patent
Cohen et al.

(10) Patent No.: US 10,501,141 B2
(45) Date of Patent: Dec. 10, 2019

(54) FOLDING TRICYCLE

(71) Applicant: MOBIUS DESIGN LTD., Caesarea (IL)

(72) Inventors: Shay Cohen, Ramat Hasharon (IL); Amit Nir, Pardes Hana (IL); Shlomi Avital, Pardes Hana (IL)

(73) Assignee: Mobius Design Ltd., Caesarea (IL)

( * ) Notice: Subject to any disclaimer, the term of this patent is extended or adjusted under 35 U.S.C. 154(b) by 0 days.

(21) Appl. No.: 16/352,520

(22) Filed: Mar. 13, 2019

(65) Prior Publication Data

US 2019/0210686 A1    Jul. 11, 2019

Related U.S. Application Data

(63) Continuation of application No. PCT/IL2017/051048, filed on Sep. 17, 2017.
(Continued)

(51) Int. Cl.
*B62K 15/00* (2006.01)
*B62K 5/06* (2006.01)
(Continued)

(52) U.S. Cl.
CPC ............ *B62K 15/008* (2013.01); *B62B 7/044* (2013.01); *B62J 27/00* (2013.01); *B62K 5/06* (2013.01);
(Continued)

(58) Field of Classification Search
CPC ...... B62K 15/008; B62K 21/02; B62K 21/10; B62K 21/16; B62K 5/06; B62K 9/02;
(Continued)

(56) References Cited

U.S. PATENT DOCUMENTS

| 6,907,949 B1 | 6/2005 | Wang |
| 6,935,649 B2 | 8/2005 | Lim |

(Continued)

FOREIGN PATENT DOCUMENTS

| CN | 103754304 | 4/2014 |
| CN | 204021135 U | 12/2014 |

(Continued)

OTHER PUBLICATIONS

International Preliminary Report on Patentability issued in app. No. PCT/IL2017/051048 (dated 2018).

(Continued)

*Primary Examiner* — Anne Marie M Boehler
(74) *Attorney, Agent, or Firm* — Barnes & Thornburg LLP

(57) ABSTRACT

A folding tricycle, having a first rear frame rotatably connected on a first end thereof with a first end of a first bottom frame; a second rear frame rotatably connected on a first end thereof with a first end of a second bottom frame; the first rear frame rotatably connected on a second end thereof with a first rear wheel; the second rear frame rotatably connected on a second end thereof with a second rear wheel; the first and second bottom frames rotatably connected on second ends thereof with a first end of a front frame; a seat frame rotatably connected on a front end thereof with one of a second end of the front frame and a front bearing member; a front wheel connected with a handlebar through one of the front frame and the front bearing member; first and second support frames connected respectively on first end thereof with the first and second rear frames and configured to stabilize the tricycle in an unfolded position; and a locking mechanism configured to lock the tricycle in an unfolded position; the tricycle is configured to be folded into a (Continued)

position where the front wheel is positioned in between the first and second rear wheels.

23 Claims, 39 Drawing Sheets

Related U.S. Application Data

(60) Provisional application No. 62/394,773, filed on Sep. 15, 2016.

(51) Int. Cl.
| | |
|---|---|
| *B62K 9/02* | (2006.01) |
| *B62B 7/06* | (2006.01) |
| *B62K 21/16* | (2006.01) |
| *B62J 27/00* | (2006.01) |
| *B62K 21/02* | (2006.01) |
| *B62B 7/04* | (2006.01) |
| *B62K 13/00* | (2006.01) |
| *B62K 19/30* | (2006.01) |
| *B62B 7/08* | (2006.01) |
| *B62B 7/12* | (2006.01) |
| *B62K 19/32* | (2006.01) |

(52) U.S. Cl.
CPC ............ *B62K 9/02* (2013.01); *B62K 13/00* (2013.01); *B62K 19/30* (2013.01); *B62K 21/02* (2013.01); *B62K 21/16* (2013.01); *B62B 7/08* (2013.01); *B62B 7/12* (2013.01); *B62B 2206/006* (2013.01); *B62K 19/32* (2013.01)

(58) Field of Classification Search
CPC ........ B62K 13/00; B62K 13/08; B62K 15/00; B62B 7/044; B62B 7/06; B62B 7/08; B62B 7/12; B62B 2206/006
USPC .......................................... 280/278, 287, 282
See application file for complete search history.

(56) References Cited

U.S. PATENT DOCUMENTS

| | | |
|---|---|---|
| D555,045 S | 11/2007 | Baron |
| D627,265 S | 11/2010 | Baron |
| 8,439,385 B2 | 5/2013 | Baron |
| 8,465,037 B2 | 6/2013 | Baron |
| 8,602,432 B2 | 12/2013 | Baron |
| 8,636,293 B2 * | 1/2014 | Eliasson ................ B62K 3/002 |
| | | 280/221 |
| 8,740,235 B2 | 6/2014 | Baron |
| 8,764,041 B1 | 7/2014 | Baron |
| 8,864,161 B2 | 10/2014 | Baron |
| D735,090 S | 7/2015 | Baron |
| 9,150,273 B2 | 10/2015 | Baron |
| 9,162,727 B2 | 10/2015 | Baron |
| 9,610,999 B2 | 4/2017 | Baron |
| 9,809,273 B2 * | 11/2017 | Barenbrug ............. B62K 13/00 |
| 9,821,875 B2 | 11/2017 | Baron |
| 9,862,447 B2 | 1/2018 | Baron |
| 9,981,679 B2 | 5/2018 | Baron |
| 2003/0151225 A1 * | 8/2003 | Lopez .................... B62K 13/00 |
| | | 280/282 |
| 2004/0061304 A1 | 4/2004 | Lim |
| 2004/0090039 A1 * | 5/2004 | Borochov ............. B62K 3/005 |
| | | 280/282 |
| 2011/0278815 A1 | 11/2011 | Khare et al. |
| 2013/0341877 A1 | 12/2013 | Baron |
| 2014/0103616 A1 | 4/2014 | Young et al. |
| 2015/0225036 A1 | 8/2015 | Baron |
| 2018/0194422 A1 * | 7/2018 | Christen .................. B62K 7/04 |
| 2018/0244335 A1 | 8/2018 | Baron |
| 2018/0273129 A1 | 9/2018 | Baron |
| 2018/0346051 A1 | 12/2018 | Baron |

FOREIGN PATENT DOCUMENTS

| | | |
|---|---|---|
| CN | 105480342 | 4/2016 |
| CN | 105501355 | 4/2016 |
| FR | 2930929 | 11/2009 |
| JP | 2006111222 | 4/2006 |
| JP | 2014088076 | 5/2014 |
| WO | WO 03/055737 | 7/2003 |
| WO | WO 03/093093 | 11/2003 |
| WO | WO 2015/028903 | 3/2015 |
| WO | WO 2015/121289 | 8/2015 |

OTHER PUBLICATIONS

Int'l Search Report and Written Opinion issued in App. No. PCT/IL2017/051048 (dated 2018).

* cited by examiner

FOLDING TRICYCLE

CROSS REFERENCE TO RELATED APPLICATIONS

This patent application is a Continuation of co-pending international patent application no. PCT/IL2017/051048, filed Sep. 17, 2017, which claims priority from and is related to U.S. Provisional Patent Application Ser. No. 62/394,773, filed Sep. 15, 2016. The disclosures set forth in the referenced applications are incorporated herein by reference in their entireties, and made a part hereof.

FIELD OF THE INVENTION

The present invention generally relates to tricycles and specifically to a foldable tricycle.

BACKGROUND

Foldable tricycles are well known products in the market. Nevertheless, attempts to create a tricycle having relatively small overall dimensions while folded have failed.

CN Pat. App. No. 201510959940 discloses "a foldable baby carriage which comprises a carriage body. A first back chair capable of being overturned is connected to the carriage body in a pivoted mode. The foldable baby carriage further comprises a carriage handle capable of being overturned, and the carriage handle comprises a carriage handle body and a casing pipe arranged below the carriage handle body. A frame pipe is arranged on the upper portion of a front wheel frame and connected with the casing pipe in a pivoted mode. The frame pipe is provided with a fixing shaft, and the free end of the casing piece abuts against the fixing shaft. By means of the foldable carriage handle, a foldable rear wheel device and the pivoted connecting mode of the first back chair, the baby carriage can be folded and retracted to a large degree, the size is reduced, and transportation and carrying are facilitated."

CN Pat. App. No. 201610035426 discloses "a foldable tricycle for children and a folding method of the foldable tricycle. The foldable tricycle for children comprises a frame and a handlebar arranged in the front of the frame, wherein the frame comprises a head tube arranged on the handlebar in a sleeving manner, an upper connecting rod assembly rotationally connected onto the head tube, a lower connecting rod assembly rotationally connected onto the head tube, a push rod assembly connected in the rear of the upper connecting rod assembly and the lower connecting rod assembly and a support rod which is rotationally connected between the upper connecting rod assembly and the lower connecting rod assembly and located in front of the push rod assembly, and the upper connecting rod assembly, the head tube, the lower connecting rod assembly and the support rod form a four-bar link mechanism; the push rod assembly is rotationally connected with the upper connecting rod assembly and is fixedly connected with or separated from the lower connecting rod assembly through a locking device; during folding, the locking device is unlocked firstly, then the push rod assembly is lifted upwards to be separated from the lower connecting rod assembly and overturned forwards, so that the push rod assembly, the handlebar, the upper connecting rod assembly and the lower connecting rod assembly are stacked sequentially from top to bottom, and size is small after folding."

CN Pat. App. No. 201420370599 discloses "a folding type child bicycle which is characterized by comprising a bicycle body. The bicycle body is composed of handlebars, a frame and a saddle. The frame is provided with a folding mechanism, a front wheel and a rear wheel, wherein the front wheel and the rear wheel are connected to the front portion and the rear portion of the frame. The folding mechanism comprises a front frame, locking parts, an upper supporting part and a rear frame. One end of the front frame is connected to the front of the bicycle body so that the handlebars, the front wheel and the rear portion of the bicycle body can be connected into one. The locking end of the front frame is movably connected to the locking end of the upper supporting part and the locking end of the rear frame through the locking parts. The other end of the rear frame is connected to the rear wheel. The other end of the upper supporting part is connected to the frame. The folding type child bicycle is simple in structure, convenient to use and capable of being widely applied to various occasions."

JP Pat. App. No. 20040303299 discloses "a tricycle which is excellent in strength and rigidity in a developed service condition and easily folded in a non-service condition". "A vehicle body frame has a front frame and a rear frame, and a rear end of the front frame and a front end of the rear frame are pivotably connected to each other by one pivotably connecting shaft in a switching manner between a developed service condition and a ridge-shaped folding, non-service condition. A seat part is pivotably attached to the front frame. The seat part is provided with a locking mechanism engaged with the rear frame and held in the developed service condition. The front end of the rear frame extends to the front frame over the pivotably connecting shaft, and has an abutted part for maintaining development which is abutted on a top face of the rear end of the front frame in the developed service condition."

U.S. patent application Ser. No. 14/053,804 discloses "a foldable tricycle that transitions between a use orientation, and a transport or storage orientation. The tricycle has a frame including a first end and a second end of the frame, a fork rotatably connected adjacent the first end of the frame, a front wheel rotatably connected to the fork, and a handlebar assembly coupled to the fork to allow for steering of the fork. The tricycle also has first and second rear wheels adjacent the second end of the frame in the use position. The rear wheels are positioned a first distance from a longitudinal axis of the frame in the use position. The first and second wheels can be transitioned to a storage position adjacent the first end of the frame and at a second distance from the longitudinal axis of the frame in the storage position, wherein the first distance from the frame is greater than the second distance from the frame. The tricycle may also have a folding assembly pivotably coupled to the second end of the frame at a first pivot location. As such, the first and second rear wheels may be connected to the folding assembly to simultaneously transition the first and second rear wheels to a storage position with the folding assembly."

JP Pat. App. No. 20120238377 discloses "the folding tricycle is constructed such that a vehicle body including a main frame, a front frame, and a rear frame is foldable by quadrangle linking, and bendable by joint parts located near a first folding shaft bisected in a vehicle body width direction for connecting the front end of the main frame to the connection cylindrical part of the front frame, and a manual pressing rod and an operation handle are interlocked with each other by connection rods inserted into the main frame. The tricycle includes a lock releasing operation member extended upward along the manual pressing rod from the pulling-up operation end side of a lock lever detachably engaged with a lock plate rotated integrally with the rear frame around a second folding shaft in the vehicle width direction to lock the folded state or the developed state of the vehicle body.

U.S. patent application Ser. No. 10/658,620 discloses "a foldable tricycle includes a center frame, a front frame to which a front wheel is rotatably attached, a rear frame to which two rear wheels are rotatably attached, and a four-bar link including a first bar that is integrated with the front frame, a second bar that is integrated with the center frame, a third bar that is integrated with the rear frame, and a fourth bar. The fourth bar has a shape of plates and covers the other bars while the link operates between an unfolded position and a folded position. Lockers that lock the link in either the unfolded position or the folded position are provided and include a pin, two recesses that receives the pin, and a tension spring that presses the pin into the recesses. A semi-circle guide guides the pin between the two positions and also covers the third bar."

U.S. patent application Ser. No. 10/877,251 discloses "a battery powered motor vehicle for transporting a rider in a standing position can be steered by either selective distribution of the rider's weight, or alternative by turning a steering console. By attaching a cargo rack, the battery powered motor vehicle can be converted to a hand truck for transporting cargo. In the hand truck mode, the battery powered motor vehicle can either be powered wherein the vehicle moves in reverse, or manually pushed wherein the vehicle is in a neutral state."

PCT App. No. FI2002/001013 discloses "an apparatus and a method for collapsing a means of transport from running position into storage position or vice versa. Collapsing is preferably performed using an electric motor or by hand, the mutual movements of the front part frame, the rear part frame and the reversible rod being preferably synchronized using cogged belt pulleys and the reversible rod. Owing to synchronization, the centre of gravity of the transport means is stable and remains within an area defined by the wheels during the entire collapsing operation, so that collapsing takes place completely without any external support."

PCT App. No. SE2003/000692 discloses "an arrangement used as a shopping trolley in the folded position and for personal transport and baggage transport in the unfolded position. It is equipped with a load carrier capable of being fitted with various load surfaces and load volumes. Without supplementary drive arrangement, it is used the unfolded position. A control in the platform releases locks in the joints, in with which the vehicle adopts a rest position a as a scooter in form of a lever on conjunction halfway between the folded and unfolded positions. Transformation between the two forms of use takes place as a single operation. The vehicle is used for short personal transport and goods transport journeys in city centers. When folded, it can be stored in the home and transported on a train/bus or in the luggage compartment of a motor car."

The present disclosure seeks to overcome certain of the limitations and other drawbacks of the above applications and prior art, and to provide new features not heretofore available. A full discussion of the features and advantages of the present disclosure is deferred to the following detailed description, which proceeds with reference to the accompanying drawings.

SUMMARY

According to an aspect of the present disclosure there is provided a folding tricycle, comprising: a first rear frame rotatably connected on a first end thereof with a first end of a first bottom frame; a second rear frame rotatably connected on a first end thereof with a first end of a second bottom frame; the first rear frame rotatably connected on a second end thereof with a first rear wheel; the second rear frame rotatably connected on a second end thereof with a second rear wheel; the first and second bottom frames rotatably connected on second ends thereof with a first end of a front frame; a seat frame rotatably connected on a front end thereof with one of a second end of the front frame and a front bearing member; a front wheel connected with a handlebar through one of the front frame and the front bearing member; first and second support frames connected respectively on first end thereof with the first and second rear frames and configured to stabilize the tricycle in an unfolded position; and a locking mechanism configured to lock the tricycle in an unfolded position; the tricycle is configured to be folded into a position where the front wheel is positioned in between the first and second rear wheels.

The folding tricycle may further comprise first and second anchors; the first and second anchors fixed respectively relative to the first and second support frames; the first rear frame, the first support frame, the first anchor and the first bottom frame are connected to each other on first ends thereof thereby creating a first folding mechanism; the second rear frame, the second support frame, the second anchor and the second bottom frame are connected to each other on first ends thereof thereby creating a second folding mechanism; the first and second support frames are connected on second ends thereof with the locking mechanism; each one of the first and second folding mechanism is configured to: position its bottom frame in a fixed position relative to its rear frame when the locking mechanism secures a locking frame to one of a rear end of the seat frame, and a seat connected with the seat frame; and enable its bottom frame to move when the locking frame is detached from the rear end of the seat frame or the seat, and its respective anchor and locking frame touch the ground.

The folding mechanism may further be configured to enable folding of the first and second rear wheels towards each other in order to minimize the overall dimensions of the tricycle.

The folding tricycle may further comprise: a wheel fork connected between the front wheel and the handlebar; the wheel fork is connected with the handlebar through the one of the front frame and the front bearing member.

The folding tricycle may further comprise a pair of pedals connected with the front wheel and configured to rotate the front wheel.

The handlebar may be telescopic.

The folding tricycle may further comprise two safety bars connected with the seat frame.

The folding tricycle may further comprise at least one telescopic bar connected with one of the seat frame and the seat.

The folding tricycle may further comprise a handle connected with the at least one telescopic bar.

The folding tricycle may further comprise a canopy connected with the at least one telescopic bar.

According to another aspect of the present disclosure there is provided a method of folding a folding tricycle, comprising: detaching the locking frame from one of the rear end of the seat frame and the seat; lowering the locking frame to the ground thereby lowering the first and second anchors to the ground; and pulling the seat frame towards the first and second rear wheels, thereby placing the front wheel in between the first and second rear wheels; and pushing the seat frame towards the handlebar, thereby folding the seat towards the handlebar.

The folding tricycle may further comprise two sliding parts rotatably connected with one of the seat frame and the seat; and a parent bar connected with a second end of the first and second support frames; the locking mechanism connected with the sliding parts and further configured to secure the sliding parts to the parent bar in the unfolded position and release the sliding parts from the parent bar thereby enabling the sliding parts to slide along the parent bar and the tricycle to be folded into a position where the front wheel is positioned in between the first and second rear wheels.

The folding tricycle may further comprise two rear supports, each fixed relative to its respective rear frame; each rear support intended to limit the movement of its respective bottom frame.

The folding tricycle may further comprise a front support configured to limit the movement of the front frame and the seat frame and to fixate the angles between the first and second bottom frames and the front frame; and between the front frame and the seat frame thus creating a stable tricycle structure in the unfolded position.

According to another aspect of the present disclosure there is provided a method of folding a folding tricycle, comprising: unlocking the locking mechanism thereby releasing the sliding parts from the parent bar and enabling the sliding parts to slide along the parent bar; sliding the sliding parts upwards along the parent bar up to a point where the angle between the first and second bottom frames and the front frame turns over; and sliding the sliding parts downward along the parent bar.

According to another aspect of the present disclosure there is provided a tricycle operable in a swivel state and a steering state, comprising: a tricycle frame; two rear wheels rotatably connected to the tricycle frame; a front wheel; a handlebar; a wheel fork rotatably connected on one end thereof to the front wheel and connected on a second end thereof to the handlebar via a swivel mechanism; the swivel mechanism comprises: a push button configured to: be pushed down and towards the tricycle frame thereby coupling the handlebar to the wheel fork and allowing a rider of the tricycle to steer; and be pushed down and away from the tricycle frame thereby detaching the handlebar from the wheel fork and allowing the front wheel to swivel; wherein the front wheel swivel rotation axis is different than the handlebar rotation axis.

The front wheel swivel rotation axis may be essentially perpendicular to the ground.

According to another aspect of the present disclosure there is provided a method of selecting a swivel state and a steering state, comprising: pushing the push button down and towards the tricycle frame thereby selecting a steering state; and pushing the push button down and away from the tricycle frame thereby selecting a swivel state.

According to another aspect of the present disclosure there is provided a tricycle operable in a swivel state and a steering state, comprising: a tricycle frame; two rear wheels rotatably connected to the tricycle frame; a front wheel; a handlebar; a wheel fork rotatably connected on one end thereof to the front wheel and connected on a second end thereof to the handlebar via a swivel mechanism; the swivel mechanism comprises: a push button configured to: be pushed down thereby coupling the handlebar to the wheel fork and allowing a rider of the tricycle to steer; and be pulled up thereby detaching the handlebar from the wheel fork and allowing the front wheel to swivel; wherein the front wheel swivel rotation axis is different than the handlebar rotation axis.

The front wheel swivel rotation axis may be essentially perpendicular to the ground.

According to another aspect of the present disclosure there is provided a method of selecting a swivel state and a steering state, comprising: pushing the push button down thereby setting a steering state; and pulling the push button up thereby setting a swivel state.

BRIEF DESCRIPTION OF THE DRAWINGS

For better understanding of the present disclosure and to show how the same may be carried into effect, reference will now be made, purely by way of example, to the accompanying drawings.

With specific reference now to the drawings in detail, it is stressed that the particulars shown are by way of example and for purposes of illustrative discussion of the preferred embodiments of the present disclosure only, and are presented in the cause of providing what is believed to be the most useful and readily understood description of the principles and conceptual aspects of the disclosure. In this regard, no attempt is made to show structural details of the disclosure in more detail than is necessary for a fundamental understanding of the disclosure, the description taken with the drawings making apparent to those skilled in the art how the several forms of the disclosure may be embodied in practice. In the accompanying drawings.

DETAILED DESCRIPTION OF PREFERRED EMBODIMENTS

Figure 1:
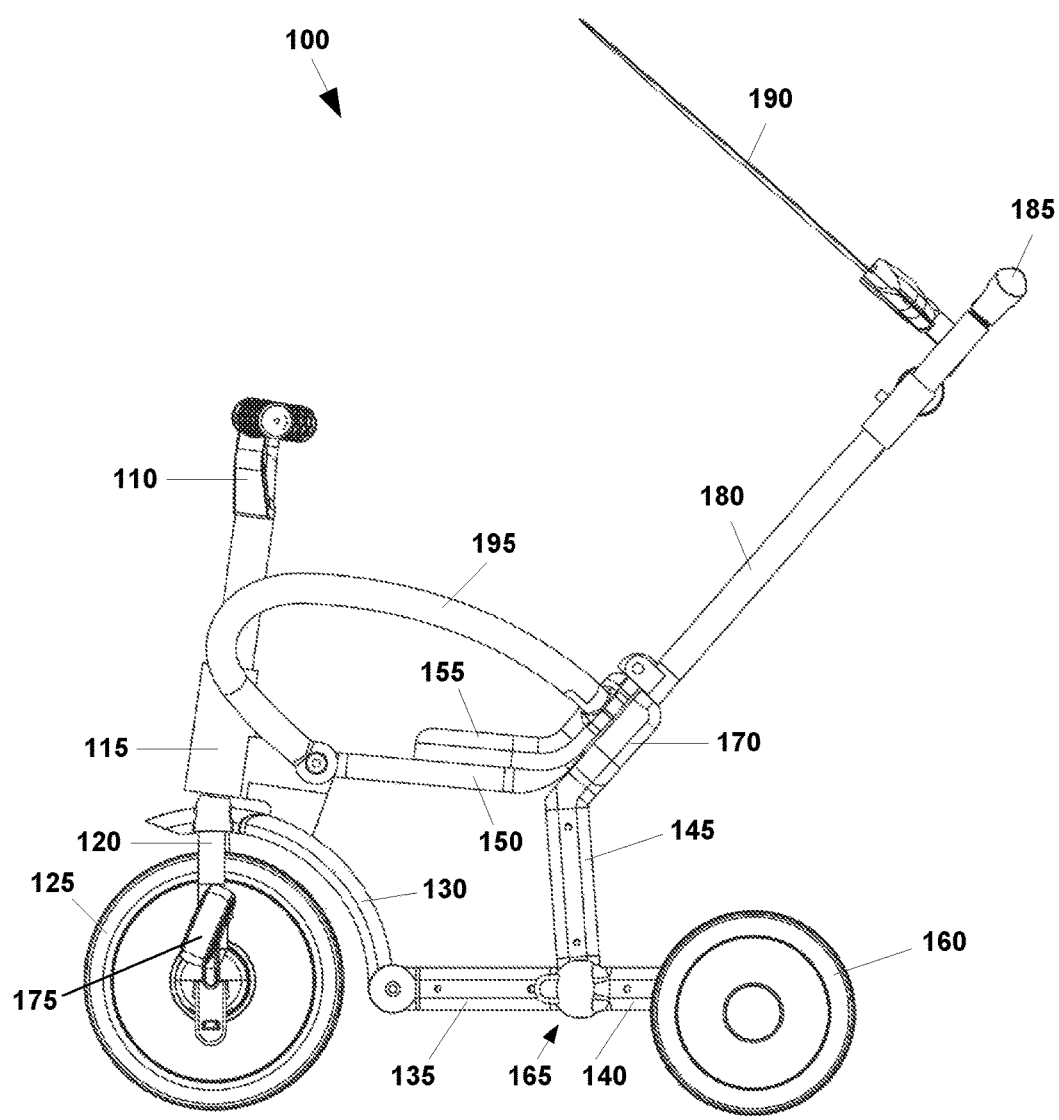
FIG. 1 is a side view of a "chain like" foldable tricycle according to embodiments of the present disclosure.

Before explaining at least one embodiment of the disclosure in detail, it is to be understood that the disclosure is not limited in its application to the details of construction and the arrangement of the components set forth in the following description or illustrated in the drawings. The present disclosure is applicable to other embodiments or of being practiced or carried out in various ways. Also, it is to be understood that the phraseology and terminology employed herein is for the purpose of description and should not be regarded as limiting.

The present disclosure provides a folding tricycle comprising a number of hinges allowing easy upright folding of the tricycle where the tricycle's front wheel is intended to be folded to in between the rear wheels.

In the following description same elements were assigned same numerals in the different embodiments.

According to embodiments of the present disclosure, the folding tricycle is a "chain like" folding tricycle. The "chain like" configuration allows a stable structure while the chain is closed and a foldable structure while the chain is open. In order to fold the tricycle, the user lowers an anchor to the ground which releases a mechanism enabling to achieve a stable structure when the chain is closed and a foldable structure when the chain is opened.

FIG. 1 is a side view of a "chain like" folding tricycle 100 according to embodiments of the present disclosure. The tricycle 100 includes a handlebar 110, a front bearing member 115, a wheel fork 120, a front wheel 125, a front frame 130, two bottom frames 135 (only one is shown), two rear frames 140 (only one is shown), two support frames 145 (only one is shown), two anchors (not shown—142 of FIG. 1A), a seat frame 150, a seat 155, two rear wheels 160 (only one is shown), two folding mechanisms 165 (only one is shown) and a locking frame 170. According to embodiment of the present disclosure, the tricycle 100 may also include, but is not limited to include, any of the following: pedals 175 (only one is shown), a handle 185 and at least one telescopic parent bar 180 connected to a bar frame (not shown—180A of FIG. 1A), a canopy 190, two safety bars 195 (only one is shown), a reclining seat (not shown), a foot rest (not shown), a back support (not shown) and a basket (not shown).

It will be appreciated that the support frames 145 are intended to stabilize the tricycle 100 in an unfolded position.

According to embodiments of the present disclosure, the handlebar 110 may be fixed or telescopic.

According to embodiments of the present disclosure, the bottom frames 135 may be formed as one piece.

According to embodiments of the present disclosure, the support frames 145 and the locking frame 170 may be formed as one piece.

According to embodiments of the present disclosure, the support frames 145, the anchors 142 and the locking frame 170 may be formed as one piece.

According to embodiments of the present disclosure, the support frames 145 and the anchors 142 may be formed as one piece.

According to embodiments of the present disclosure, the front bearing member 115 and the front frame 130 may be formed as one piece.

Figure 1A:
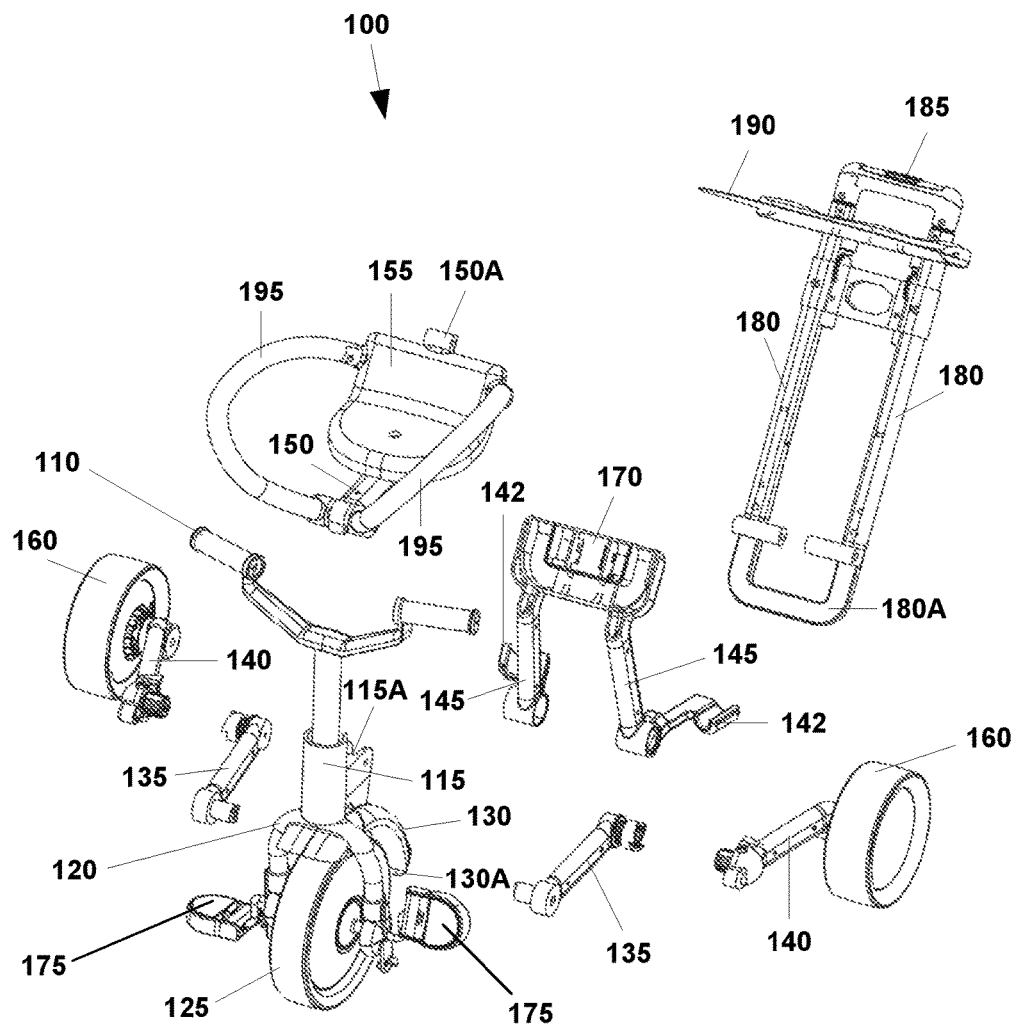
FIG. 1A is an exploded side view of FIG. 1.

FIG. 1A is an exploded side view of FIG. 1. As can be seen each rear frame 140 and its respective support frame 145 are connected to the rear end of their respective bottom frame 135 via their respective folding mechanism 165 (shown in FIG. 1). The front frame 130 is connected to the front end of both bottom frames 135 via bottom hinge 130A. The front frame 130 is connected with the front bearing member 115. The handlebar 110 is connected with the wheel fork 120 through the front bearing member 115. The front bearing member 115 is connected to the seat frame 150 via front hinge 115A. The back side of the seat 155 is detachably connected with the locking frame 170 via a locking mechanism having a male part and a female part in order to enable stable structure when the locking mechanism is secured and folding when the locking mechanism is opened. The locking frame 170 is connected to the upper end of both support frames 145. According to embodiments of the present disclosure, the bar frame 180A is connected with the seat frame 150 via seat hinge 150A. The canopy 190 is connected to the telescopic parent bar(s) 180 via a canopy hinge (not shown).

Figure 1B:
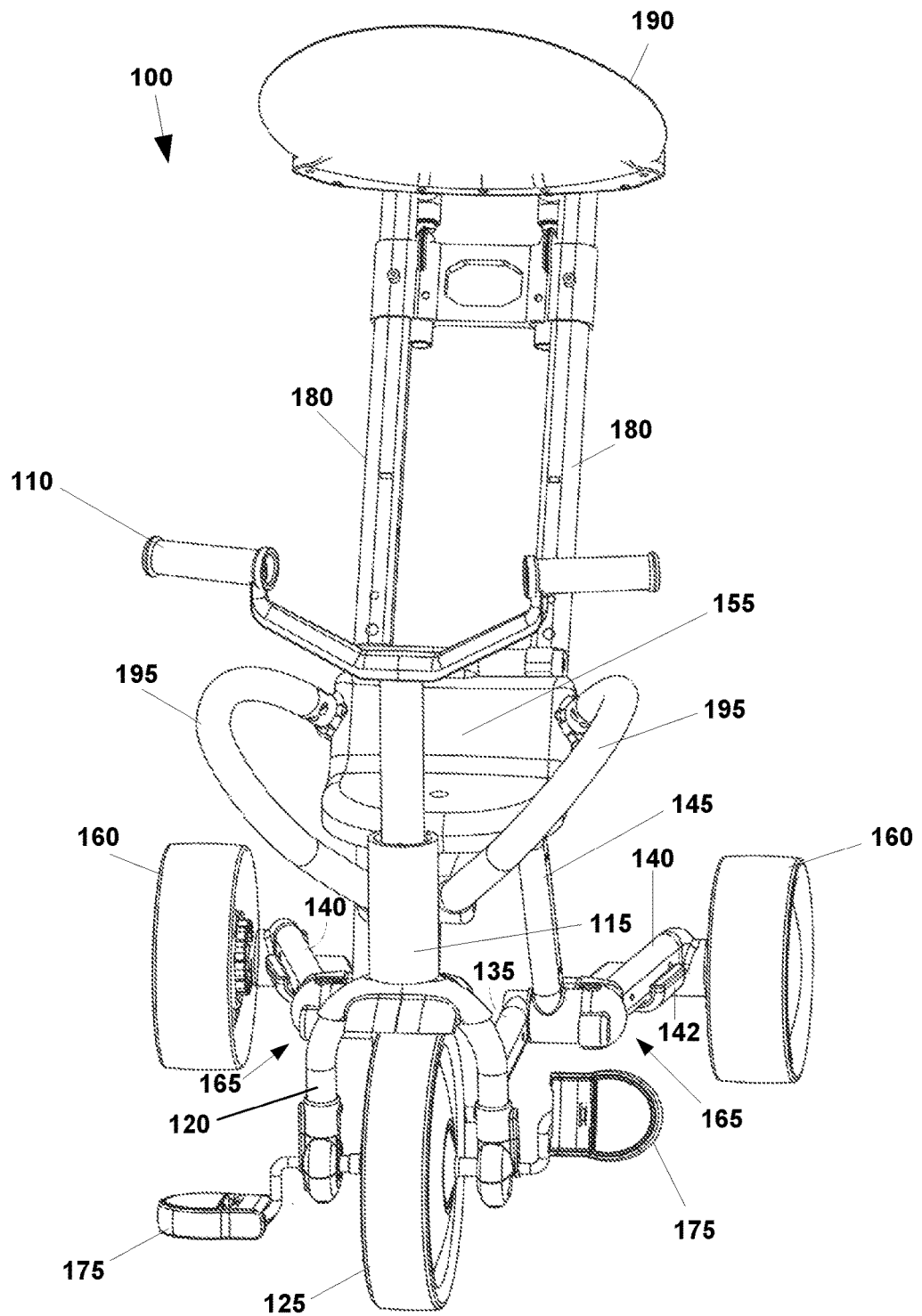
FIG. 1B is a front perspective view of the tricycle of FIG. 1 when the "chain like" foldable tricycle is in closed position.

FIG. 1B is a front perspective view of the tricycle 100 of FIG. 1 when the "chain like" folding tricycle is in closed position, namely, when the chain is closed.

Figure 1C:
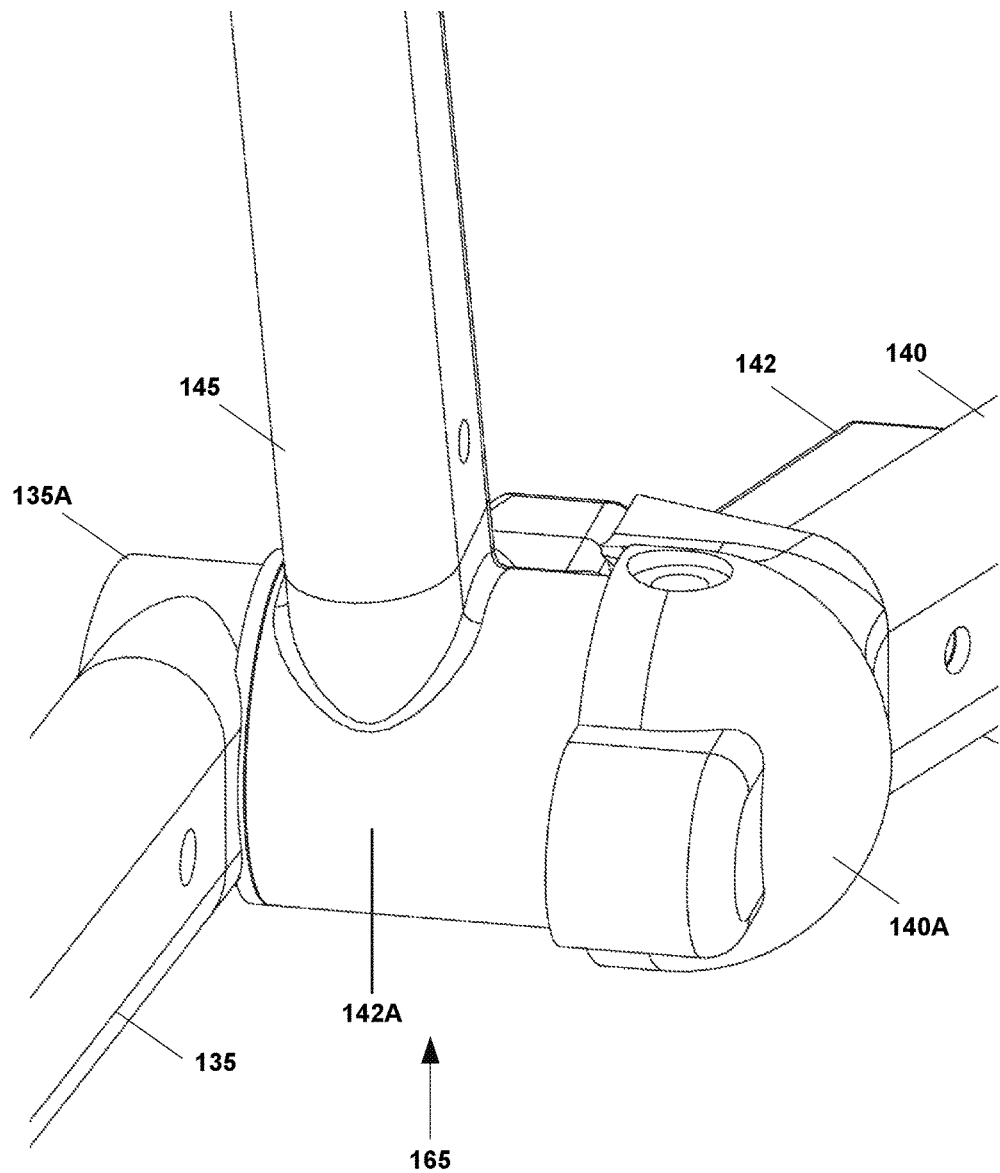
FIG. 1C is a front close up view of the folding mechanism of FIG. 1 when the "chain like" foldable tricycle is in closed position.

FIG. 1C is a front close up view of the folding mechanism 165 of FIG. 1 when the "chain like" folding tricycle is in closed position. It will be appreciated that the explanations provided in respect to the left folding mechanism also apply to the right folding mechanism. The rear end 142A of the anchor 142 encircles the folding mechanism which will be shown in details in FIG. 1D and is rotatably connected to the front end 140A of the rear frame 140 and the rear end 135A of the bottom frame 135. The anchor 142 and the support frame 145 share the same end 142A and are fixed relative to each other.

Figure 1D:
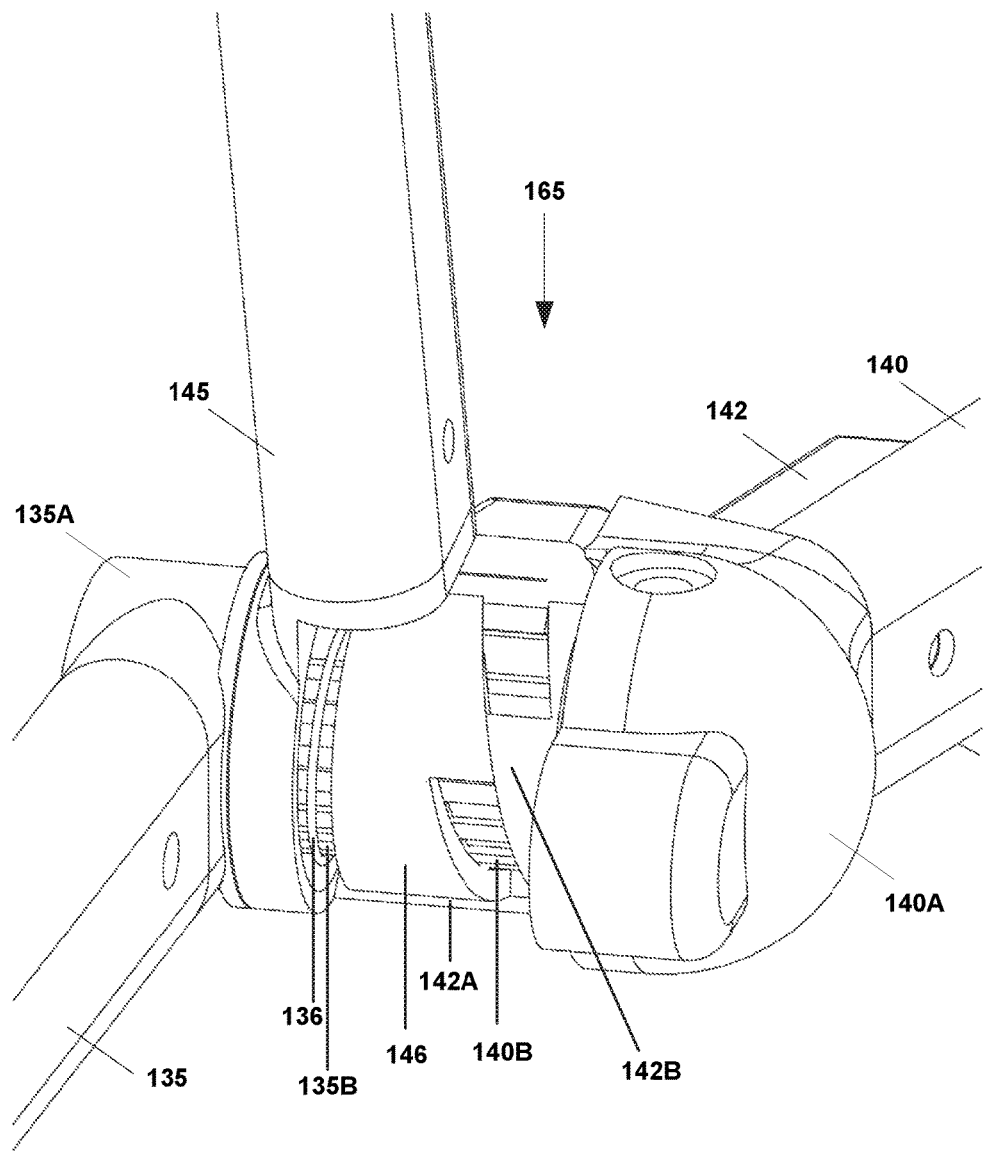
FIG. 1D is a front close up inner view of the folding mechanism of FIG. 1 when the "chain like" foldable tricycle is in closed position.

FIG. 1D is a front close up inner view of the folding mechanism 165 of FIG. 1 when the "chain like" folding tricycle is in closed position. The rear end inner part 135B of the bottom frame 135 is a connector having a cogwheel outer shape. Part 140B connected with the front end 140A of the rear frame 140 is a connector having a cogwheel outer shape. According to embodiments of the present disclosure, part 140 is connected with the front end 140A of the rear frame 140 via a hinge. Ring 146 encircles the connectors 135B and 140B and has an inner cogwheel shape, where the protrusions of the ring 146 are positioned in the depressions of connectors 135A and 140A and vice versa, thus securing the connectors 135A and 140A to each other and preventing movement of the bottom frame 135 while the tricycle is in closed position. The ring's 146 side facing the inner side 142B of the rear end 142A has a wide part which gradually becomes narrow. The inner side 142B of the rear end 142A also has a wide part which gradually becomes narrow. Spring 136 is intended to ensure constant contact between ring 146 and the inner side 142B. In this position, when the "chain like" folding tricycle is in closed position, the widest parts of both ring 146 and inner side 142B are facing each other while spring 136 presses ring 146 against the inner side 142B of the rear end 142A.

Figure 2:
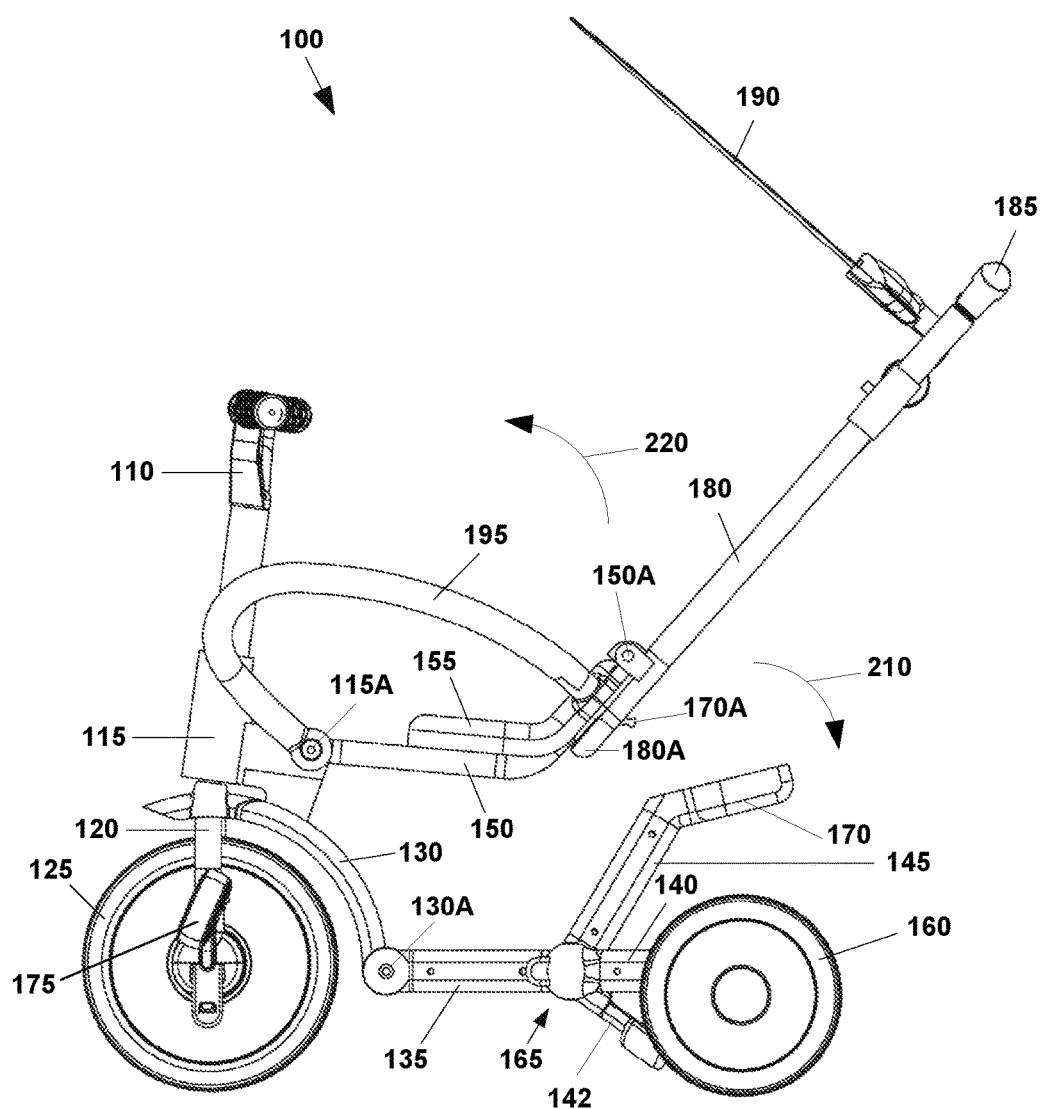
FIG. 2 is a side view of the tricycle demonstrating the first stage of the folding process.

FIG. 2 is a side view of tricycle 100 demonstrating the first stage of the folding process. It will be appreciated that the folding process is continuous. The folding process is presented in stages and the anchor 142, the support frame 145 and the locking frame 170 are positioned as demonstrated only for the purpose of demonstration and explanation and are not limited to this exact position. In the first stage of the folding process, the user unlocks the locking frame 170 and pulls it downwards in the direction of arrow 210. The locking frame 170 includes a female part (not shown) intended to be connected with a male part 170A (or vise versa) in order to secure the locking frame 170 to the back side of the seat 155. When the user pulls the locking frame 170 downwards, the anchor 142 meets the ground and supports the tricycle's structure. According to embodiments of the present disclosure, from the displayed position, the front hinge 115A only enables movement in the direction of arrow 220 thus preventing the collapsing of the seat frame 150 to the direction of arrow 210. It will be appreciated that the locking mechanism may be any locking mechanism known in the art and capable of securing the locking frame 170 to the seat 155, for example, a paddle latch, toggle latch, lever operated latch, etc.

Figure 2A:
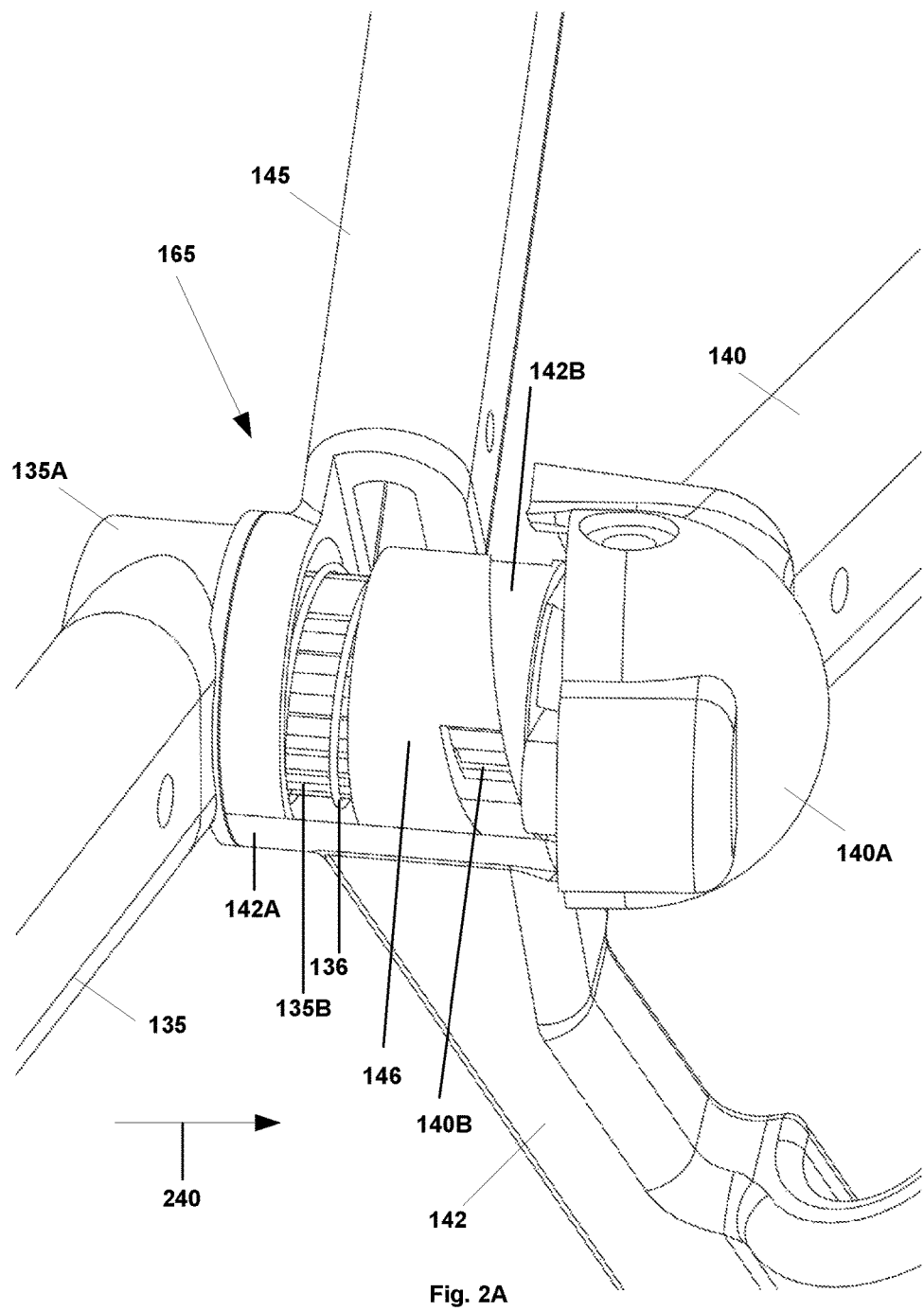
FIG. 2A is a front close up inner view of the folding mechanism during the first stage of the folding process.

FIG. 2A is a front close up inner view of the folding mechanism 165 during the first stage of the folding process. When the user pulls the locking frame 170 downwards in the direction of arrow 210 of FIG. 2, the anchor 142 meets the ground and supports the tricycle's structure. In this stage, the inner side 142B of the rear end 142A is rotated such that it becomes narrower during the rotation thus enabling the ring 146 to move in the direction of arrow 240. Spring 136 presses the ring 146 against the inner side 142B of the rear end 142A thus ensuring constant contact between ring 146 and the inner side 142B.

Figure 3:
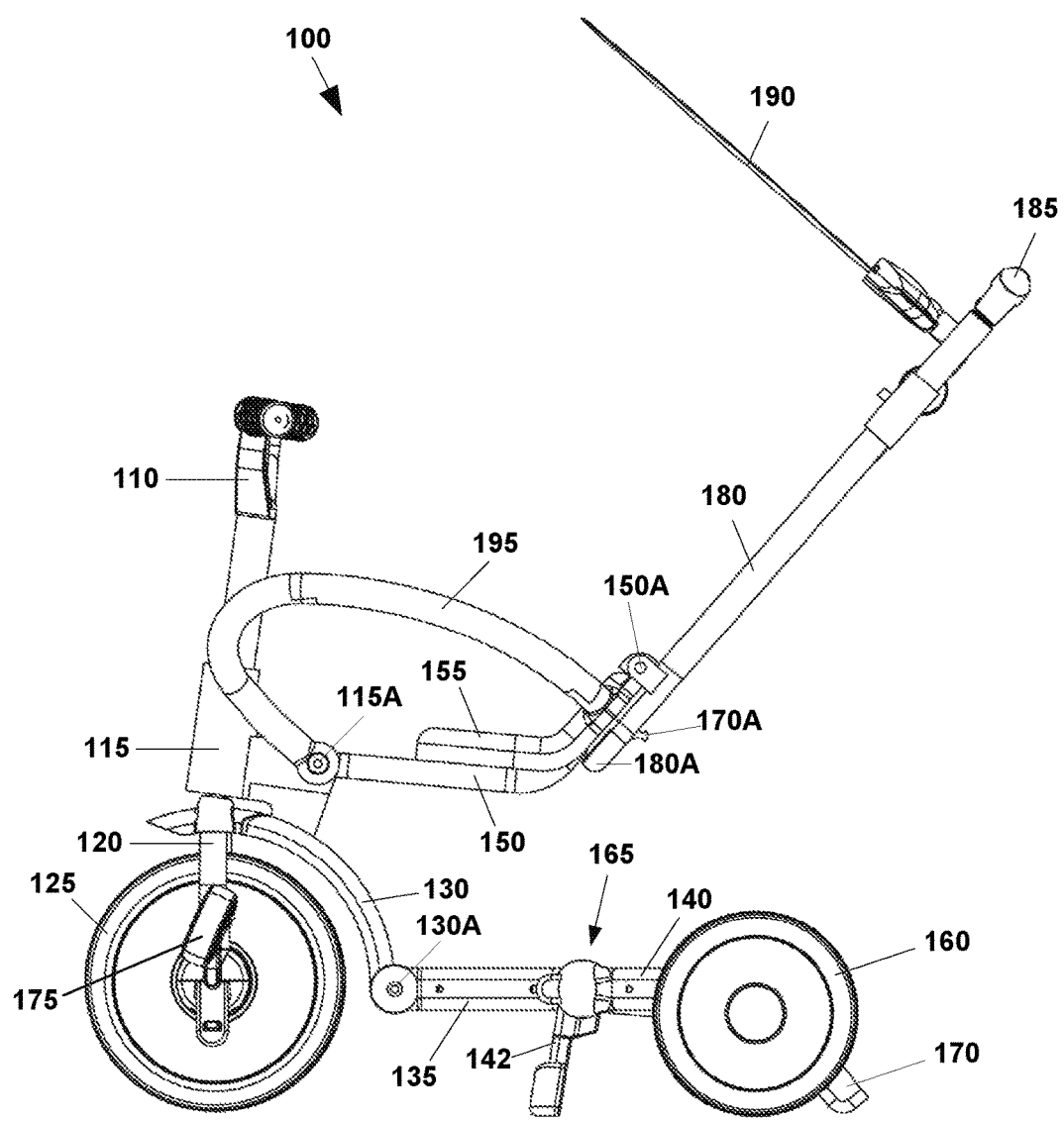
FIG. 3 is a side view of the tricycle demonstrating the second stage of the folding process.

FIG. 3 is a side view of tricycle 100 demonstrating the second stage of the folding process. In the second stage, the user lowers the locking frame 170 to the ground thus creating a stable basis including the locking frame 170 and the anchor 142 for the rest of the tricycle to fold on.

Figure 3A:
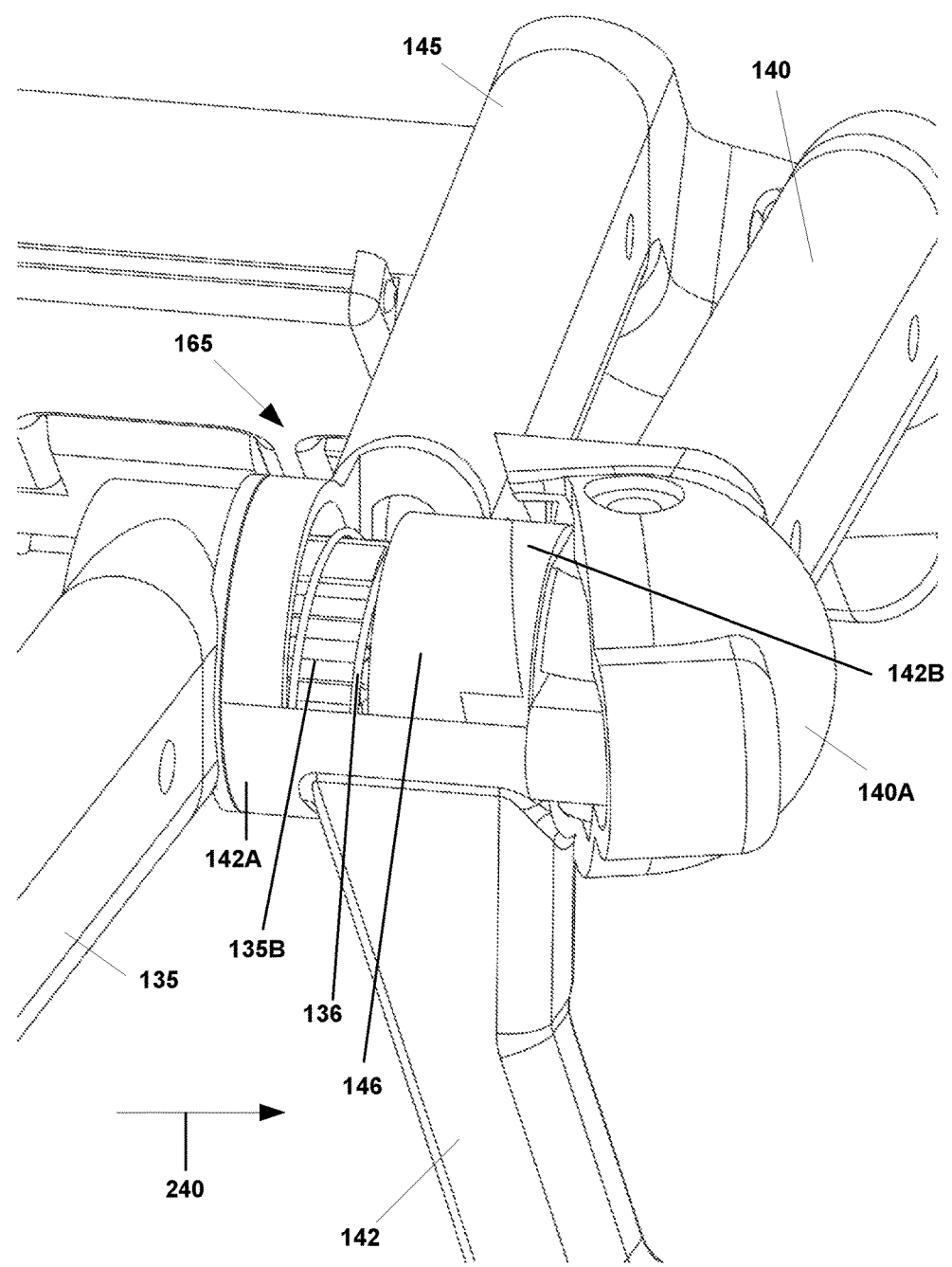
FIG. 3A is a front close up inner view of the folding mechanism during the second stage of the folding process.

FIG. 3A is a front close up inner view of the folding mechanism 165 during the second stage of the folding process. In this stage, the inner side 142B of the rear end 142A is rotated such that the narrowest part of the inner side 142B meets the widest part of the ring 146 and vise versa thus releasing the securing of connector 135B to connector 140B and enabling movement of the bottom frame 135. Again, spring 136 presses the ring 146 against the inner side 142B of the rear end 142A thus pushing the ring 146 in the direction of arrow 240.

Figure 3B:
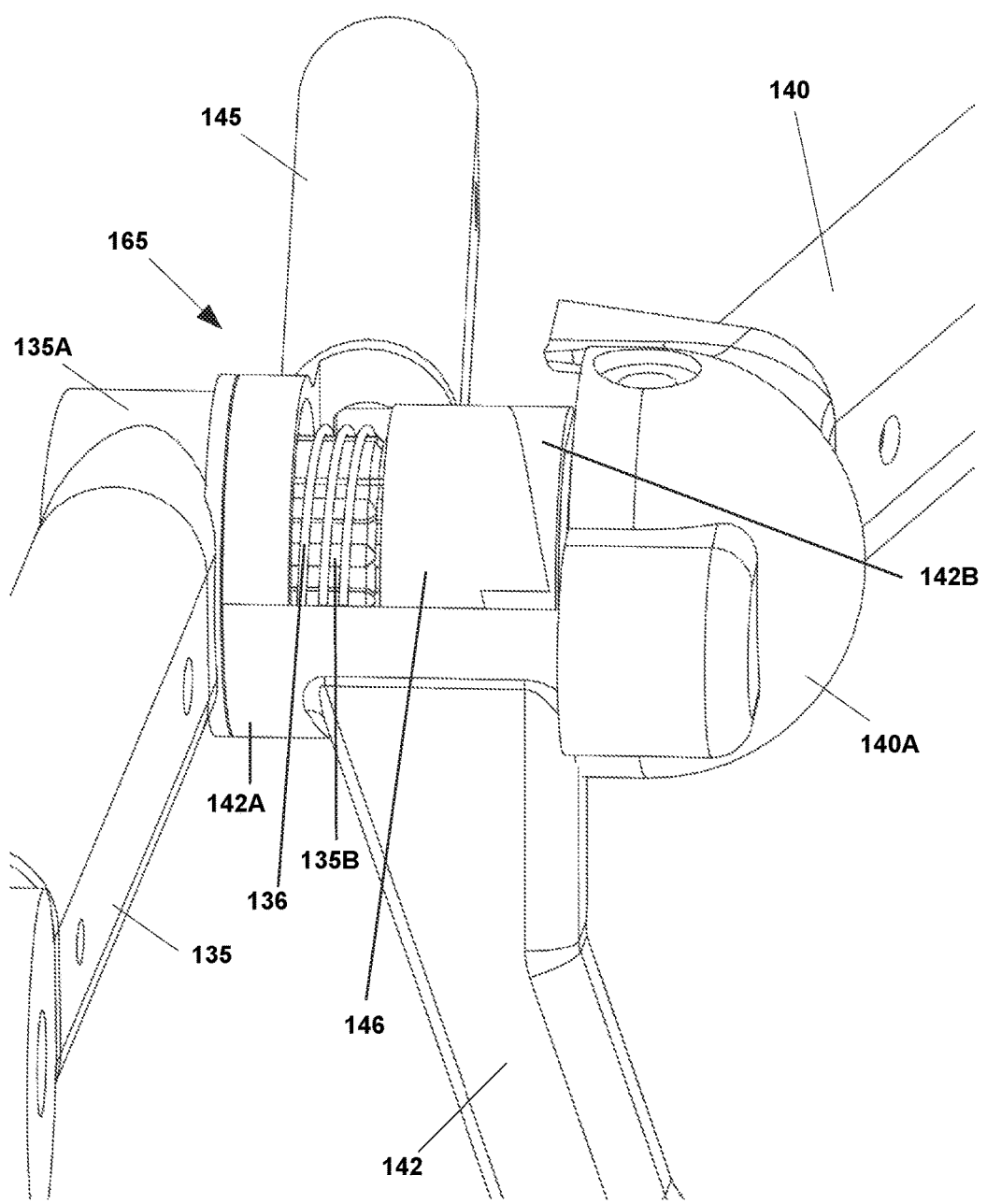
FIG. 3B is another front close up inner view, from a different angle, of the folding mechanism in the second stage of the folding process.

FIG. 3B is another front close up inner view, from a different angle, of the folding mechanism 165 in the second stage of the folding process. As can be seen, the cogwheel outer shape of the connector 135B is released from the inner cogwheel shape of the ring 146 thus enabling the movement of the bottom frame 135.

Figure 4:
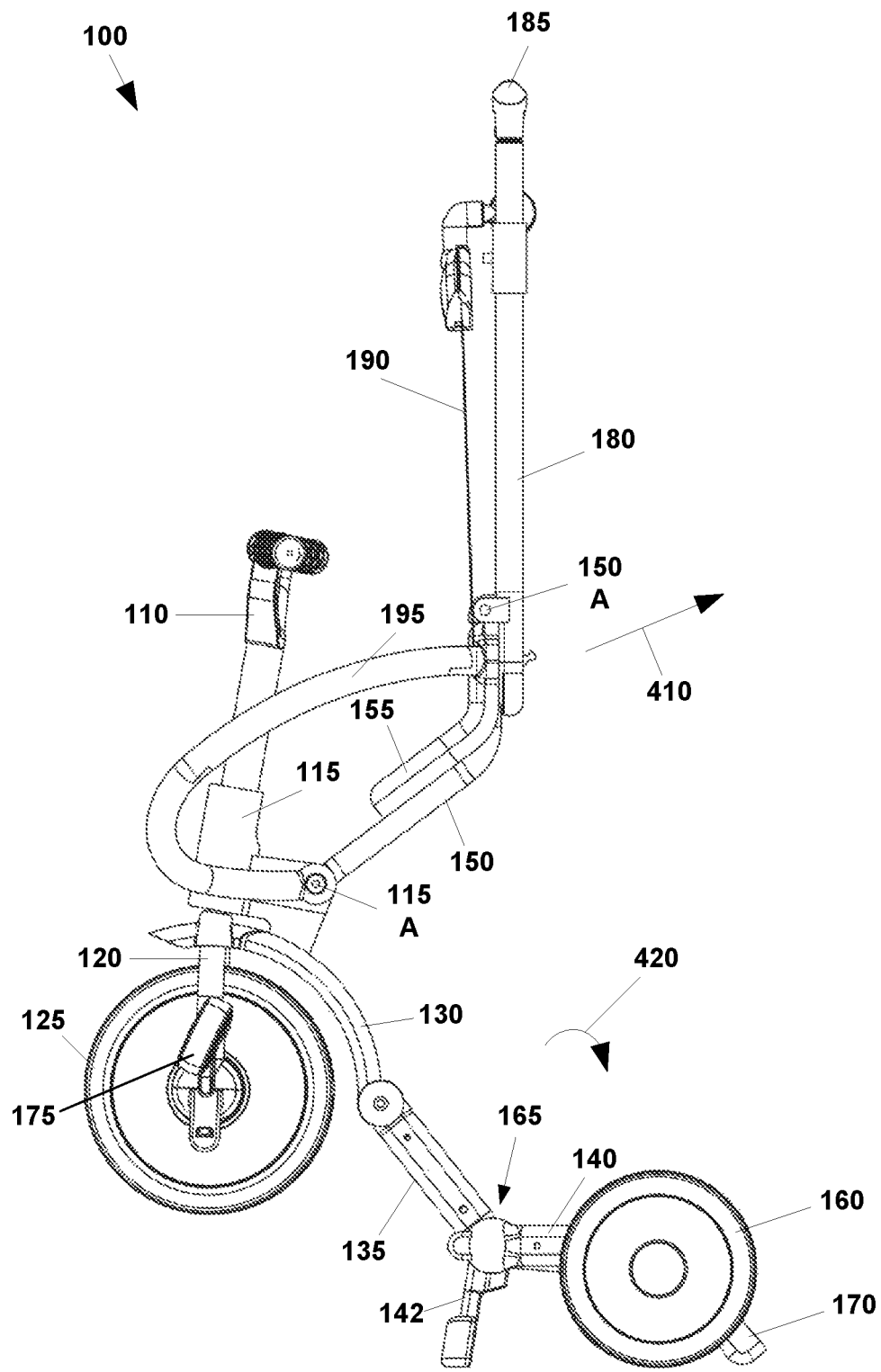
FIG. 4 is a side view of the tricycle demonstrating the third stage of the folding process.

FIG. 4 is a side view of tricycle 100 demonstrating the third stage of the folding process. Again, it will be appreciated that the folding process is continuous. The seat frame 150, the front frame 130 and the bottom frame 135 are positioned as demonstrated only for the purpose of demonstration and explanation and are not limited to this exact position. In the third stage, the user folds the canopy 190 and pulls the seat 155 in the direction of arrow 410 thus causing the bottom frame 135 to move in the direction of arrow 420. It will be appreciated that the pulling direction is not limited to the exact angle of arrow 410 which is provided for the purpose of demonstration. It will be appreciated that the tricycle 100 is not limited to include the telescopic parent bar(s) 180, the handle 185 and the canopy 190. In a case where there are no telescopic parent bar(s) 180, handle 185 and canopy 190, the user may pull the seat frame 150 or the seat 155 in the direction of arrow 410.

It will be appreciated that in case where the tricycle 100 includes the canopy 190, the canopy 190 may be folded in any of the folding stages 1-3.

Figure 5:
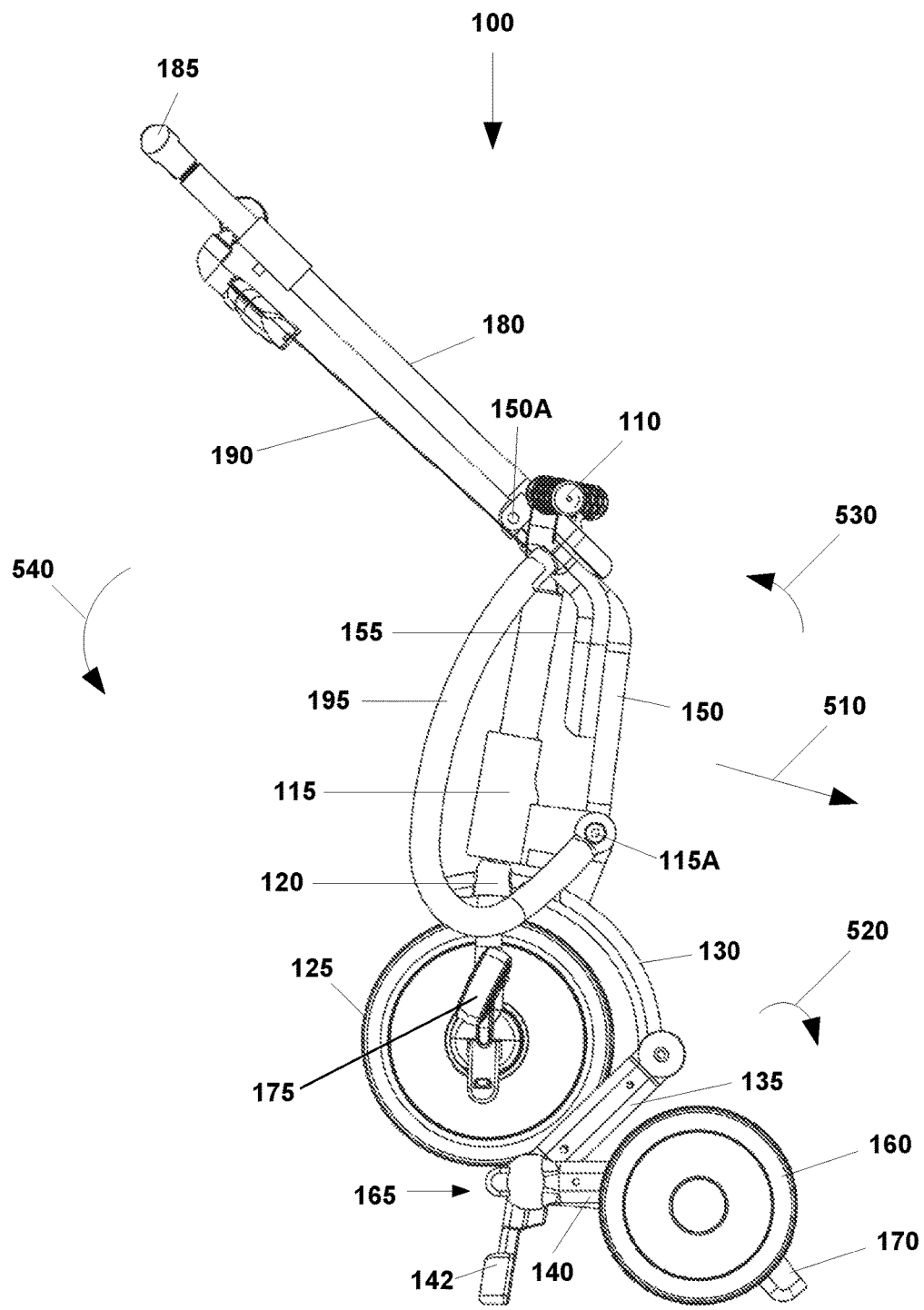
FIG. 5 is a side view of the tricycle demonstrating the fourth stage of the folding process.

FIG. 5 is a side view of tricycle 100 demonstrating the fourth stage of the folding process. In the fourth stage, the user pulls the seat frame 150 or the seat 155 backwards in the direction of arrow 510 thus causing the bottom frame 135 to fold backwards in the direction of arrow 520. Additionally, the user pushes the seat frame 150 in the direction of arrow 530 thus folding the seat frame as presented.

Figure 6:
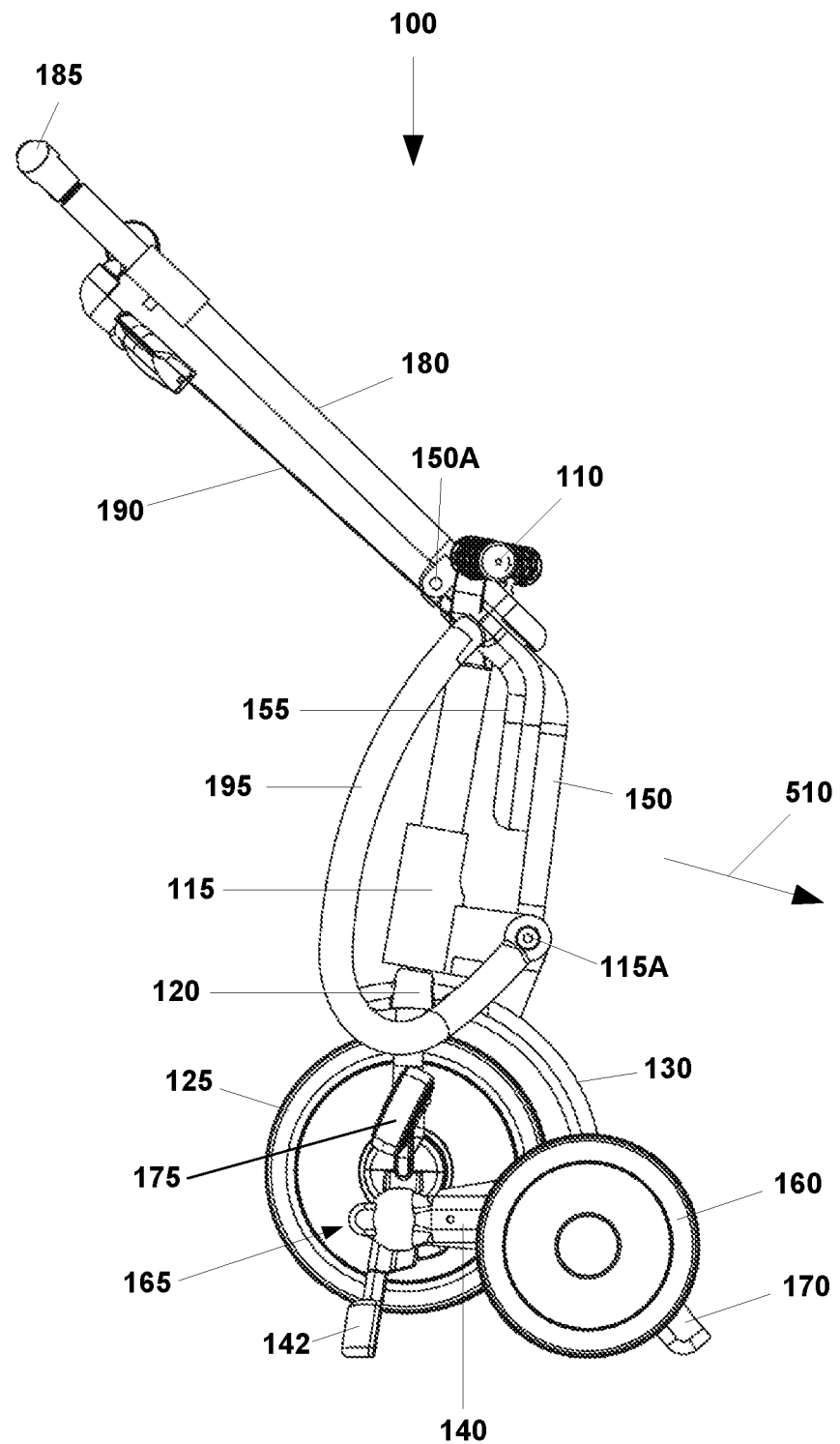
FIG. 6 is a side view of the tricycle demonstrating the position of the tricycle at the end of the fourth stage of the folding process.

FIG. 6 is a side view of tricycle 100 demonstrating the position of the tricycle 100 at the end of the fourth stage of the folding process. In a case where there are no telescopic parent bar(s) 180, handle 185 and canopy 190, the fourth stage is the last stage of the folding process.

Figure 7:
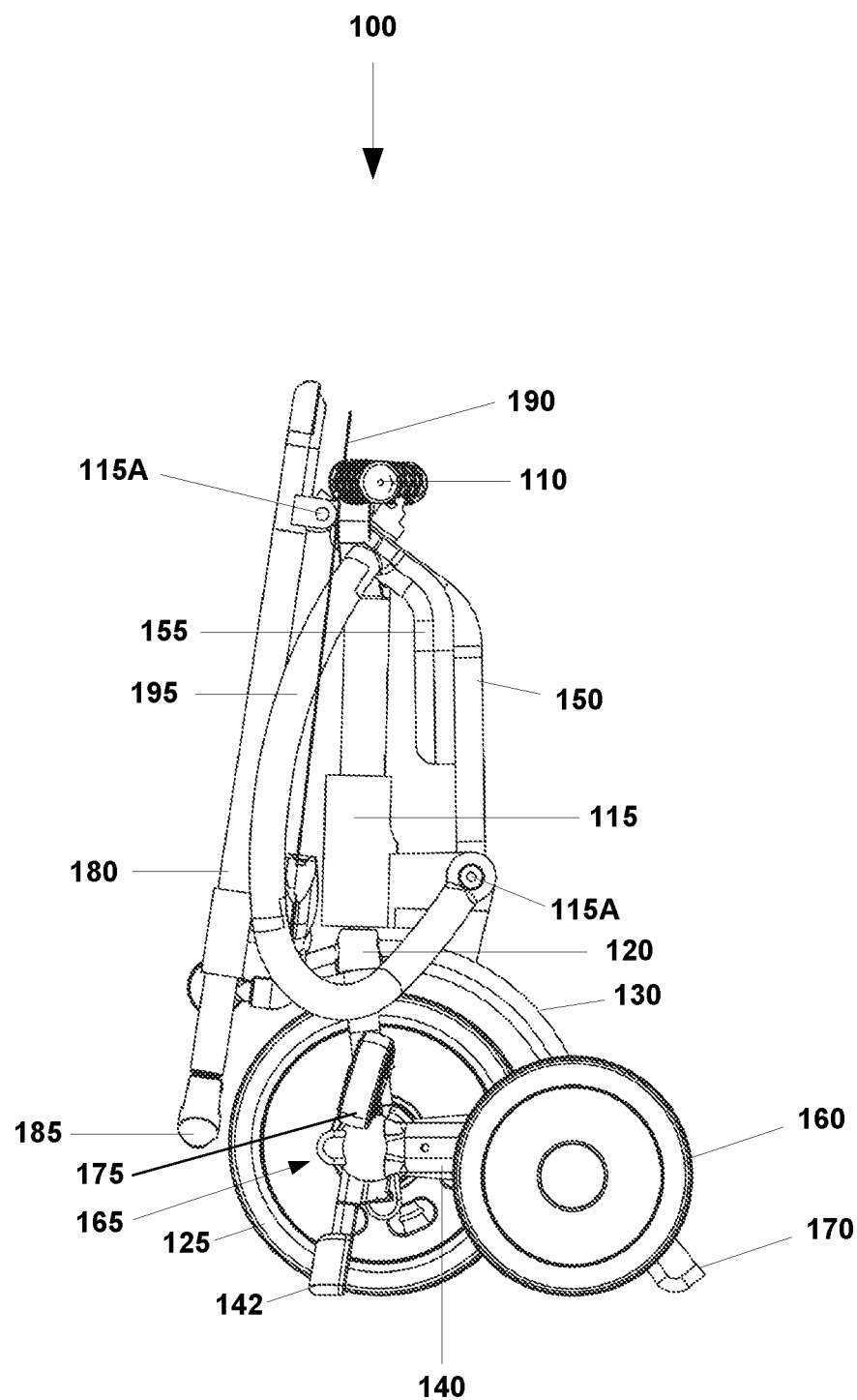
FIG. 7 is a side view of the tricycle demonstrating the fifth stage of the folding process.

FIG. 7 is a side view of tricycle 100 demonstrating the fifth stage of the folding process. In a case where the tricycle 100 includes a telescopic parent bar(s) 180, a handle 185 and a canopy 190, in the fifth stage, the user folds the telescopic parent bar(s) 180 in the direction of arrow 540 (FIG. 5) and completes the process.

Figure 8:
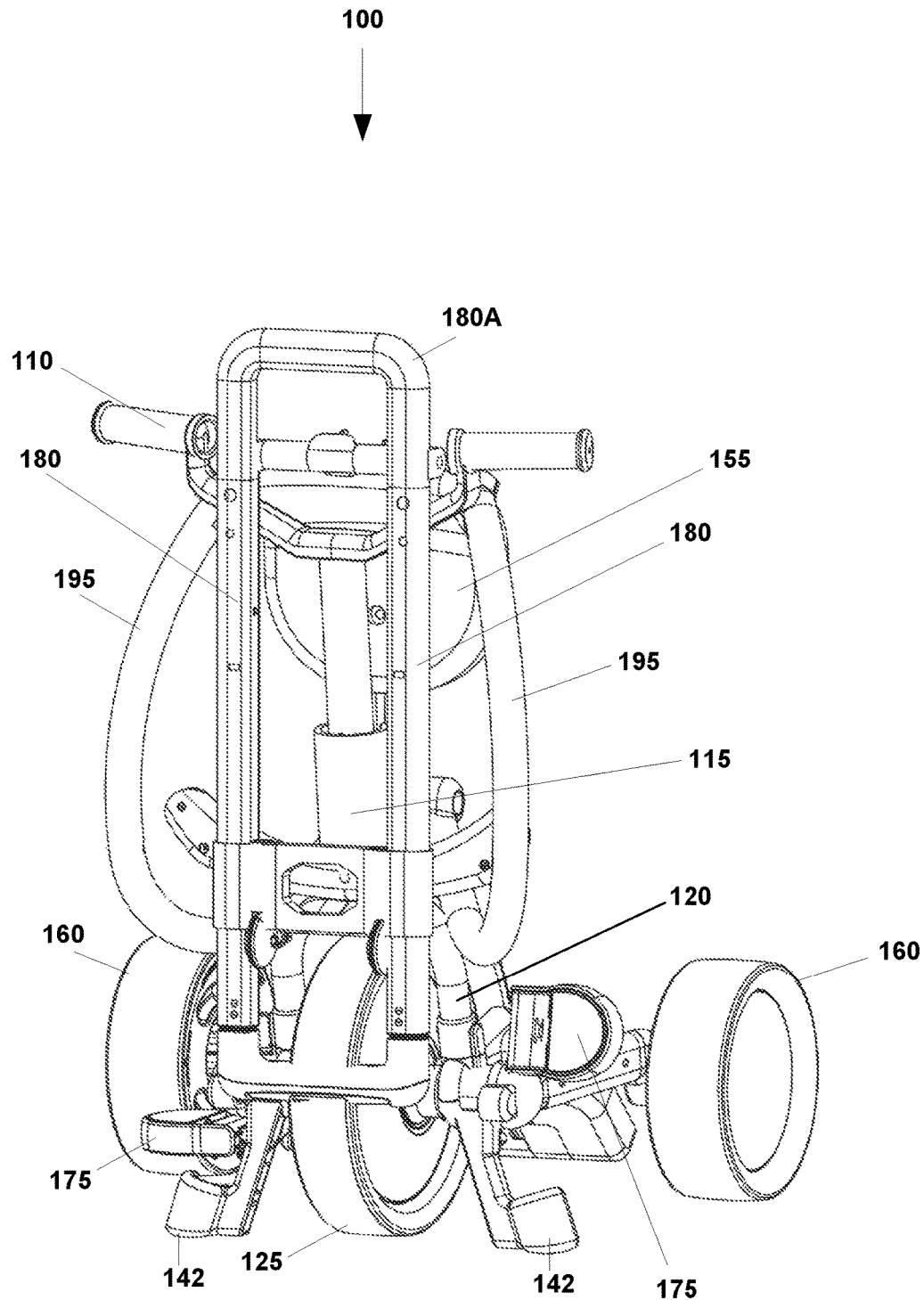
FIG. 8 is a front perspective view of the tricycle at the end of the folding process.

FIG. 8 is a front perspective view of the tricycle 100 at the end of the folding process.

It will be appreciated that the distance between the seat hinge 150A and the handlebar 110 is designed to enable the folding of the telescopic handle bar(s) 180 over and to the front side of the handlebar 110.

According to embodiments of the present disclosure, during the folding process described above, both rear wheels 160 may fold towards each other in order to minimize the overall dimensions of the tricycle.

According to embodiments of the present disclosure, the user may lock the tricycle folded.

Figure 9:
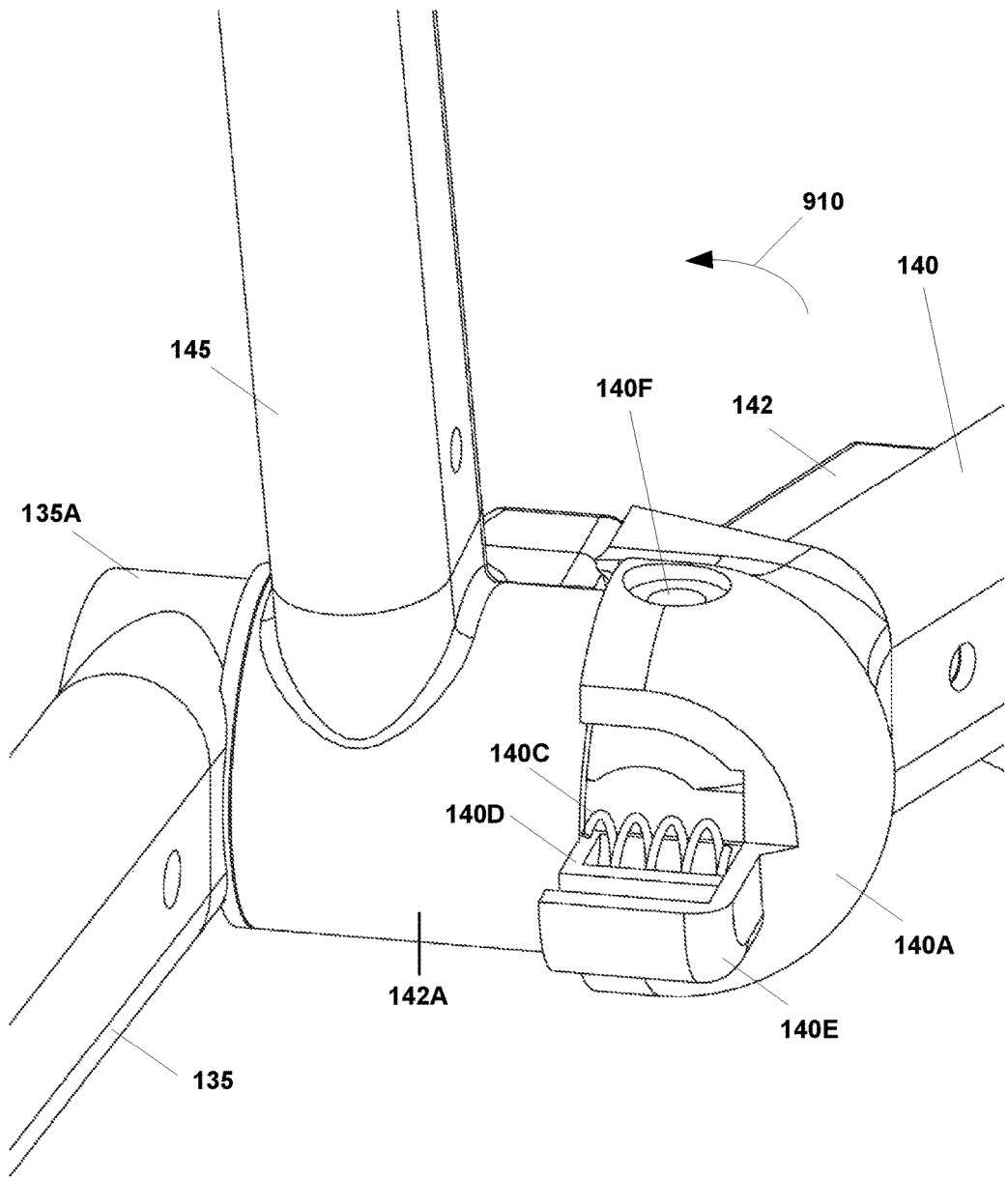
FIG. 9 is a front close up inner view of the front end of the rear frame when the "chain like" foldable tricycle is in closed position.

FIG. 9 is a front close up inner view of the front end 140A of the rear frame 140 when the "chain like" folding tricycle 100 is in closed position (FIG. 1). It will be appreciated that the explanations provided in respect to the left front end 140A of the left rear frame 140 also apply to the right front end 140A of the right rear frame 140. The front end 140A of the rear frame 140 includes a spring 140C pressed between part 140D and the front end 140A. Due to the spring 140C and the hinge 140F the rear frame 140 tends to move in the direction of arrow 910 but, in this position, the anchor 142 prevents this movement.

Figure 10:
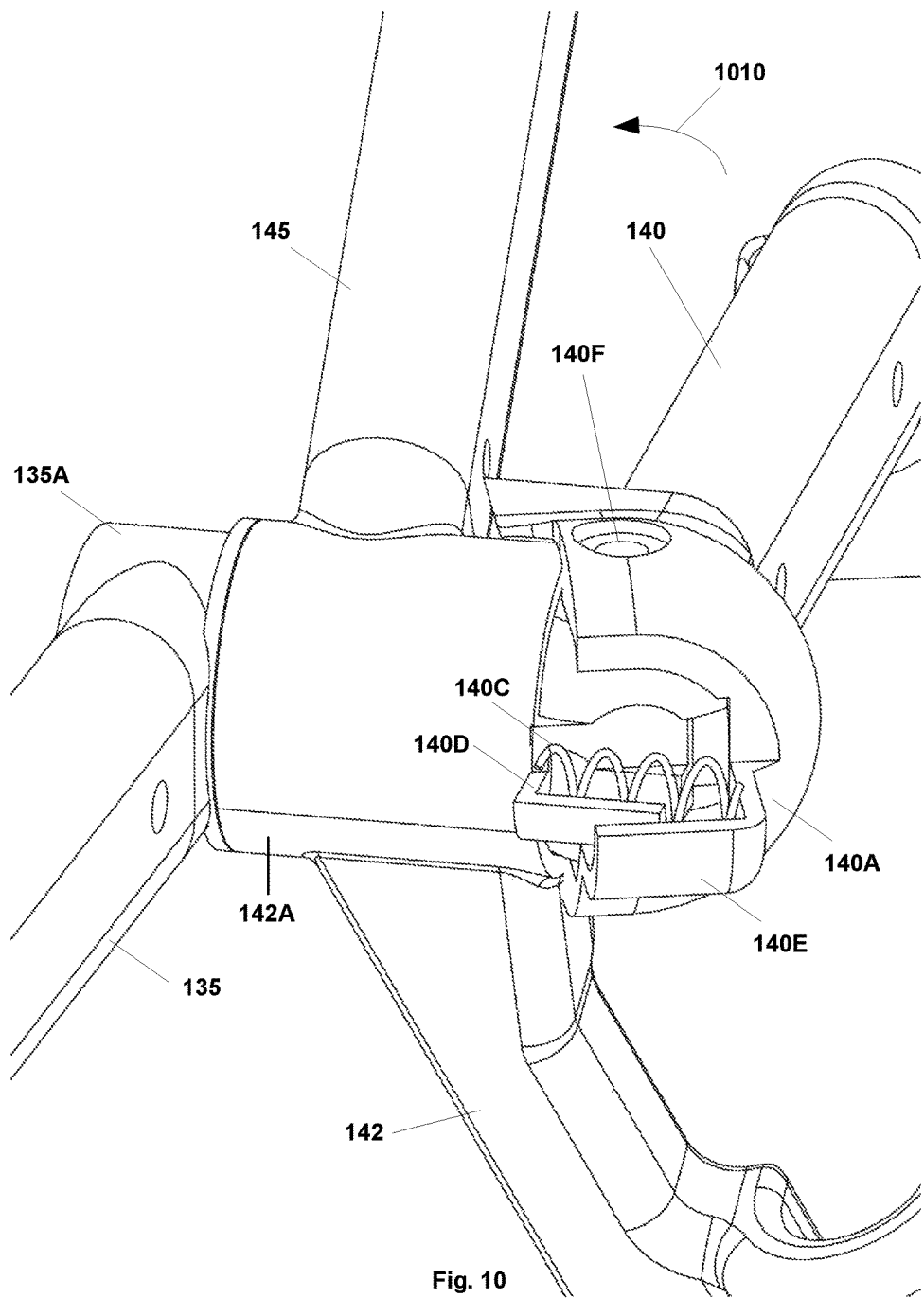
FIG. 10 is a front close up inner view of the front end of the rear frame during the second stage of the folding process.

FIG. 10 is a front close up inner view of the front end 140A of the rear frame 140 during the second stage of the folding process (FIG. 3). When the user performs the second stage of the folding process as described above in conjunction with FIG. 3, the anchor 142 meets the ground and is no longer preventing the rear frame 140 from moving in the direction of arrow 1010. Thus, the spring 140C pushes front end 140A and folds the rear frame 140, which is connected with the rear wheel 160 (not shown), in the direction of arrow 1010.

It will be appreciated that in order to unfold the tricycle 100, the user may perform the same instructions in reverse order.

Figure 11:
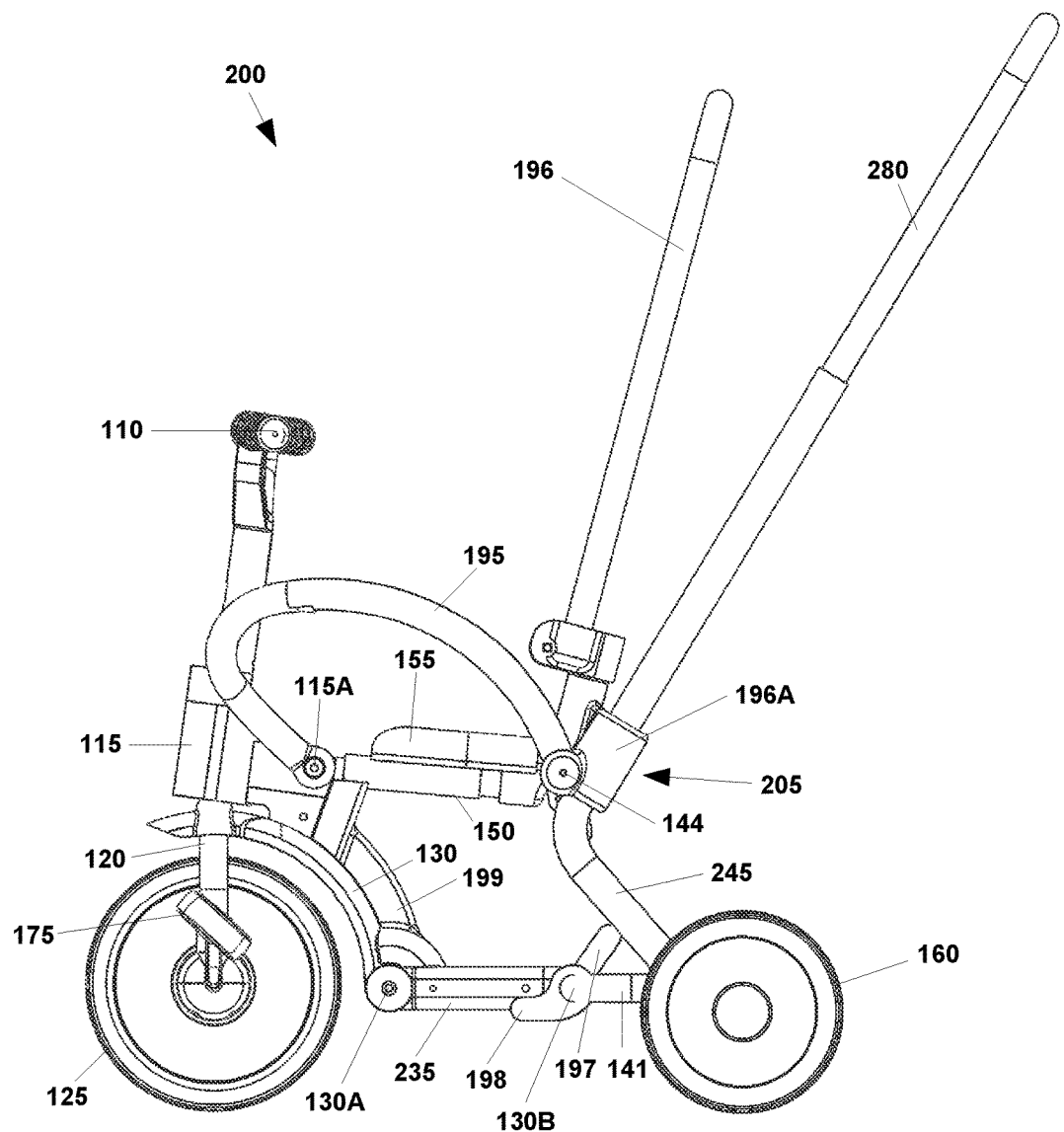
FIG. 11 is a side view of a foldable tricycle according to embodiments of the present disclosure.

FIG. 11 is a side view of a folding tricycle 200 according to embodiments of the present disclosure. The tricycle 200 includes a handlebar 110, a front bearing member 115, a wheel fork 120, a front wheel 125, a front frame 130, two bottom frames 235 (only one is shown) rotatably connected with the front frame 130 via bottom hinge 130A, two rear frames 141 (only one is shown) respectively rotatably connected with the bottom frames 235 via two rear hinges 130B (only one is shown), two support frames 245 (only one is shown) respectively connected with the rear frames 141 on one end thereof and with a parent bar 280 on a second end thereof, a seat frame 150 rotatably connected with the front bearing member 115 (or the front frame 130) via front hinge 115A, a seat 155 connected with the seat frame 150, two rear wheels 160 (only one is shown) respectively rotatably connected with the rear frames 141, two sliding parts 196A (only one is shown) connected with the seat frame 150 or the seat 155 via seat hinges 144 (only one is shown), and a locking mechanism 205. According to embodiment of the present disclosure, the tricycle 200 may also include, but is not limited to include, any of the following: two pedals 175 (only one is shown), a canopy (not shown), two safety bars 195 (only one is shown), a reclining seat (not shown), at least one foot rest (not shown), a back support 196, two bottom supports 197 (only one is shown), each fixed relative to its respective bottom frame 235, and a basket (not shown).

According to embodiments of the present disclosure, the tricycle 200 may also include two rear supports 198 (only one is shown) and a front support 199. The rear supports 198, each fixed relative to its respective rear frame 141, each intended to limit the movement of its respective bottom frame 235. The front support 199 is intended to limit the movement of the front frame 130 and the seat frame 150 and to fixate the angles between the bottom frames 235 and the front frame 130 and between the front frame 130 and the seat frame 150 thus creating a stable tricycle structure in the unfolded position.

It will be appreciated that the support frames 245 are intended to stabilize the tricycle 200 in the unfolded position.

According to embodiments of the present disclosure, the parent bar 280 may be a telescopic parent bar.

According to embodiments of the present disclosure, the parent bar may be designed as two separate bars.

According to embodiments of the present disclosure, the handlebar 110 may be fixed or telescopic.

According to embodiments of the present disclosure, the front bearing member 115 and the front frame 130 may be formed as one piece. In such an embodiment, the seat frame 150 is rotatably connected with the front frame 130 which comprises the front bearing member 115 via front hinge 115A.

Figure 11A:
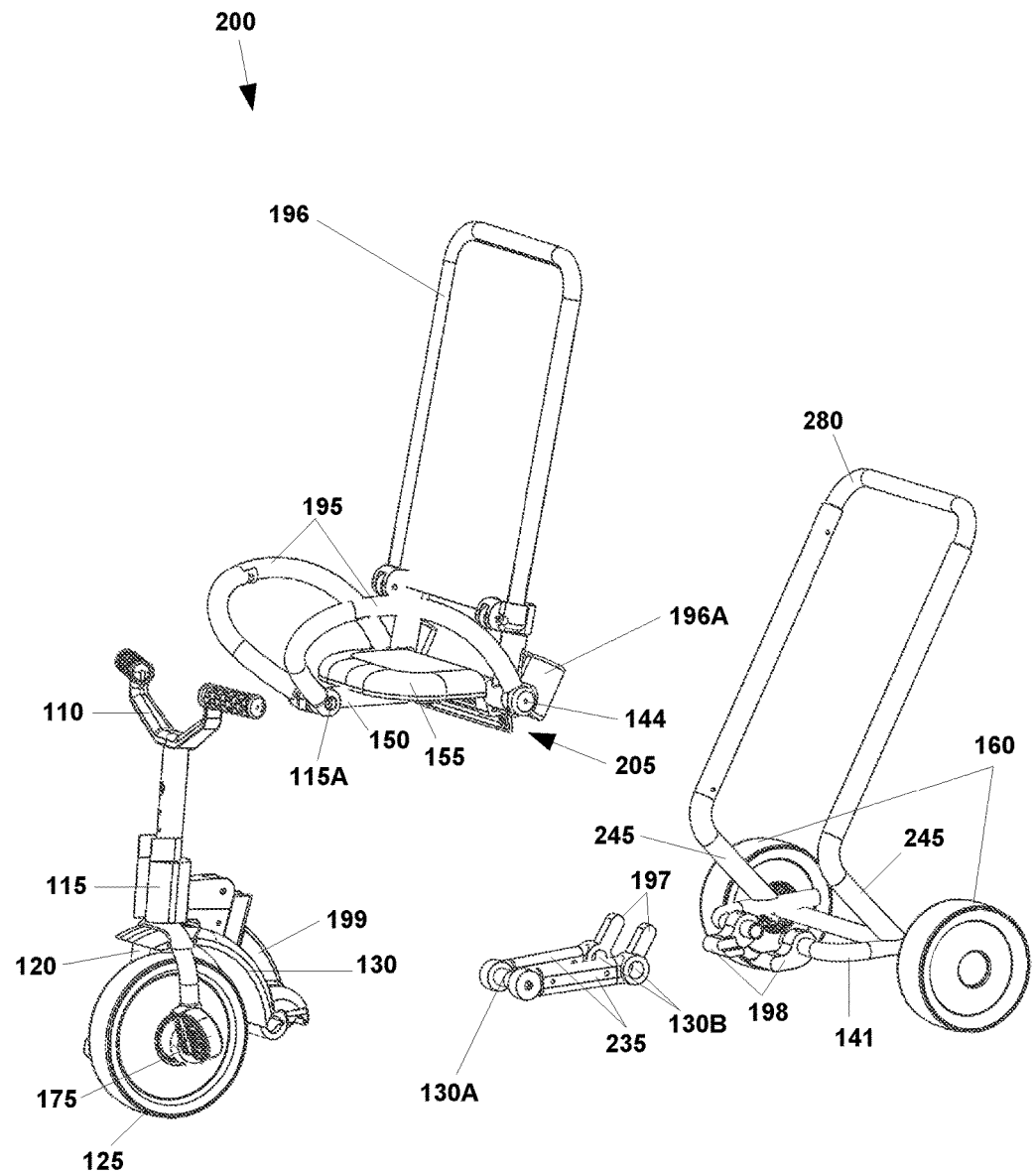
FIG. 11A is an exploded side view of the tricycle of FIG. 11.

FIG. 11A is an exploded side view of FIG. 11. As mentioned above each rear frame 141 is rotatably connected with the rear end of its respective bottom frame 235 via the respective rear hinge 130B. The front frame 130 is rotatably connected with the front end of both bottom frames 235 via bottom hinge 130A. The handlebar 110 is connected with the wheel fork 120 through the front bearing member 115. The front bearing member 115 (or, according to embodiments of the present disclosure, the front frame 130) is rotatably connected with the seat frame 150 via front hinge 115A. The back side of the seat 155 or the seat frame 150 is connected with the locking mechanism 205 and with sliding parts 196A (only one is shown). According to embodiments of the present disclosure, a canopy (not shown) may be connected with the upper end of the back support 196 or with the upper end of the parent bar 280 via a canopy hinge (not shown). According to embodiments of the present disclosure, the bottom supports 197 support the tricycle 200 in the folded position as will be demonstrated below in conjunction with FIG. 15.

Figure 11B:
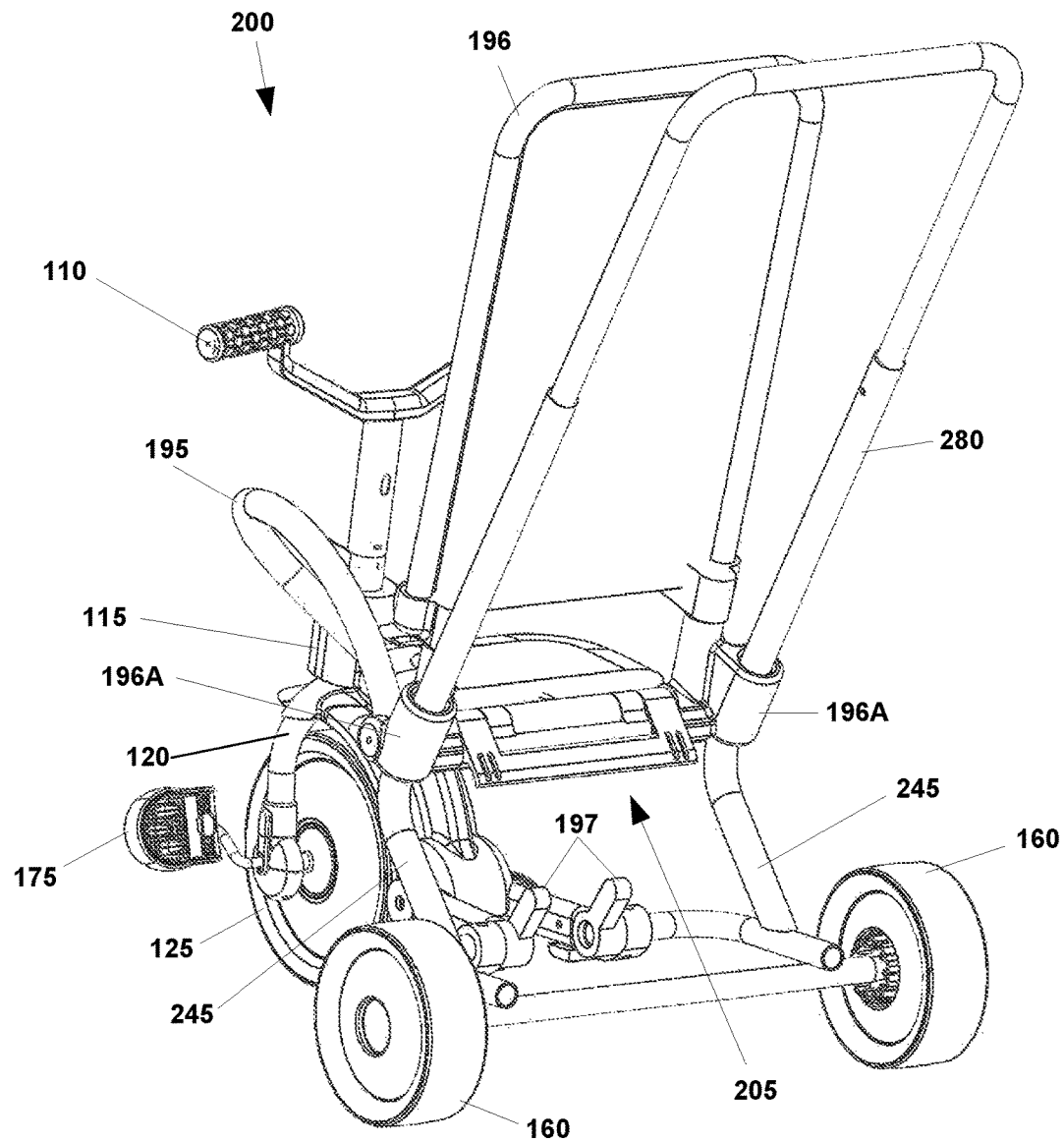
FIG. 11B is a back perspective view of the tricycle of FIG. 11 in an unfolded position.

FIG. 11B is a back perspective view of the tricycle 200 of FIG. 11 in an unfolded position. As can be seen, the locking mechanism 205 secures sliding parts 196A to the parent bar 280 thus preventing sliding parts 196A from sliding along the parent bar 280.

Figure 12:
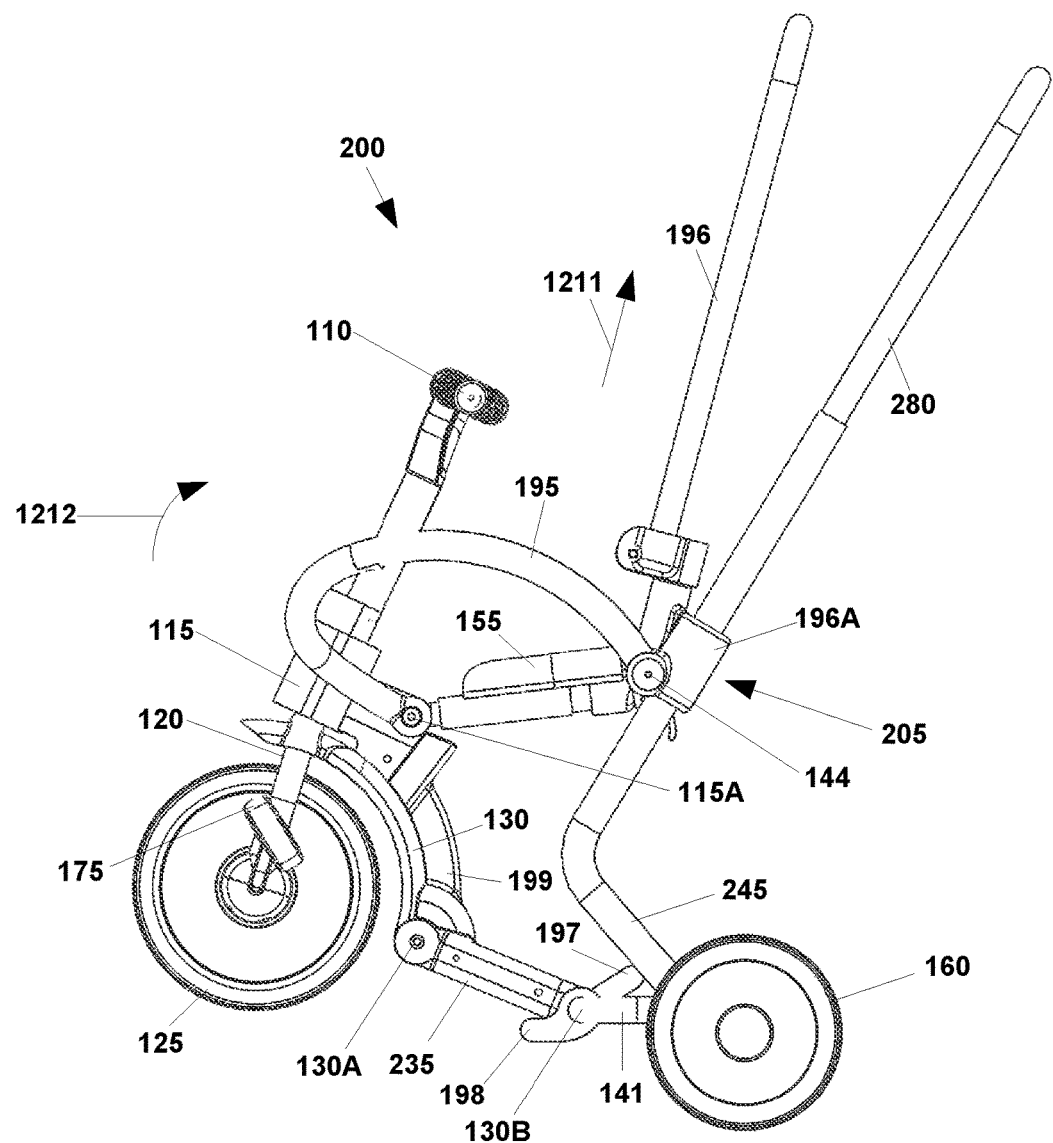
FIG. 12 is a side view of the tricycle of FIG. 11 demonstrating the beginning of the folding process.

FIG. 12 is a side view of tricycle 200 demonstrating the beginning of the folding process. It will be appreciated that the folding process is continuous, presented in stages and the tricycle is positioned as demonstrated only for the purpose of demonstration and explanation and is not limited to this exact position. In the beginning of the folding process, the user unlocks the locking mechanism 205 thereby releasing sliding parts 196A (only one is shown) from the parent bar 280 and pulls the back support 196 in the direction of arrow 1211. When the user pulls the back support 196 in the direction of arrow 1211, sliding parts 196A slide up on the parent bar 280 and pull the front wheel 125 in the direction of arrow 1212. It will be appreciated that the locking mechanism 205 may be any locking mechanism known in the art and capable of securing sliding parts 196A to the parent bar 280, for example, a paddle latch, toggle latch, lever operated latch, etc.

It will be appreciated that the back support 196 is optional. According to embodiments of the present disclosure, if the back support 196 does not exist, the user may use e.g. the seat 155 in order to pull sliding parts 196A in the direction of arrow 1211 and start the folding process.

Figure 13:
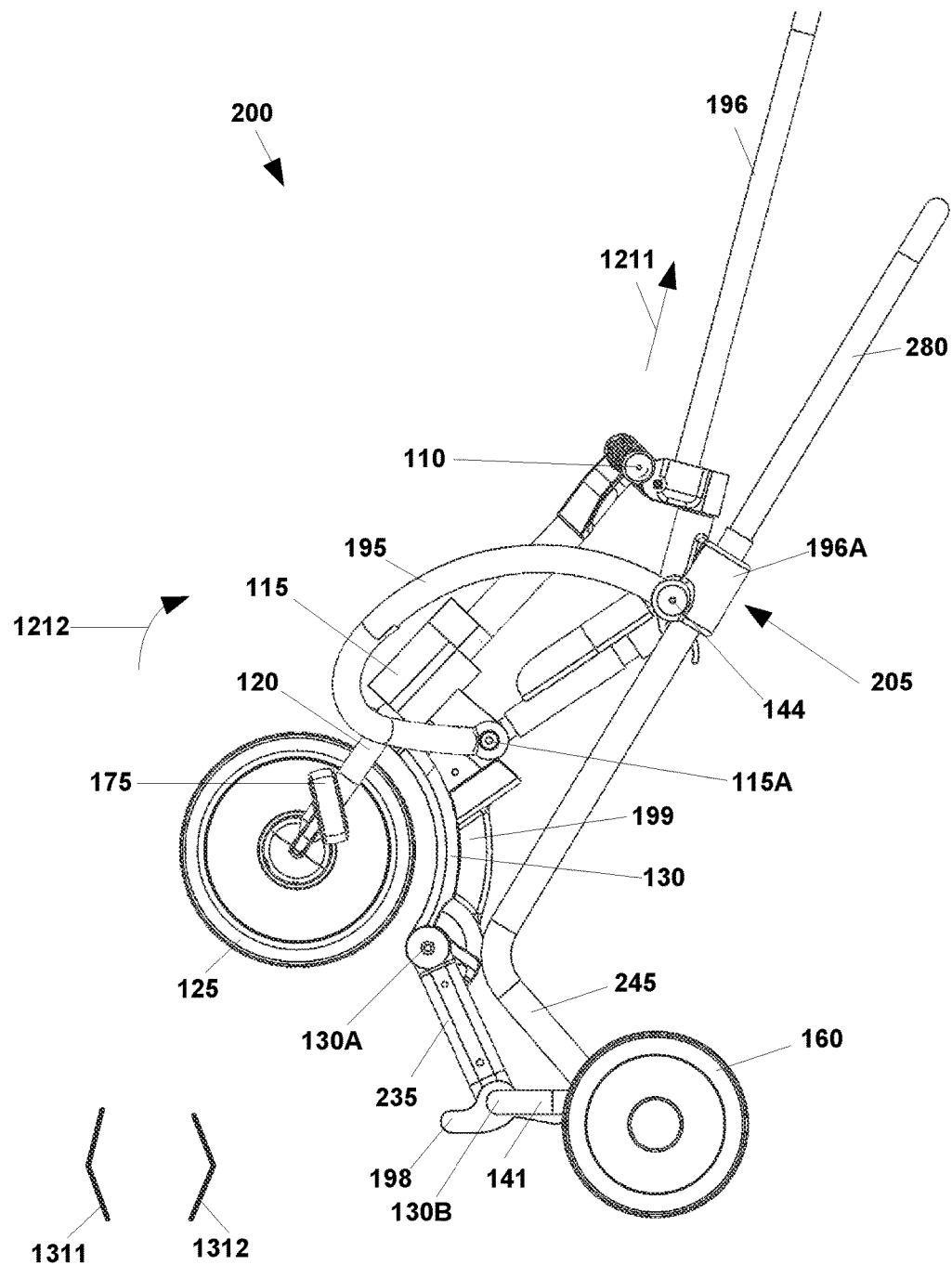
FIG. 13 to FIG. 17 are side views of the tricycle of FIG. 11 demonstrating the continuation of the folding process.

FIG. 13 is a side view of tricycle 200 demonstrating the continuation of the folding process. As the user keeps pulling the back support 196 in the direction of arrow 1211, sliding parts 196A slide up on the parent bar 280 and pull the front wheel 125 in the direction of arrow 1212. The user keeps pulling the back support 196 up to a point where the position of the bottom frames 235 relative to the front frame 130 changes from the position demonstrated by lines 1311 to the position demonstrated by lines 1312. When the position changes, the user may stop pulling the back support 196.

It will be appreciated that the pulling direction is not limited to the exact angle demonstrated by arrow 1211 which is provided for the purpose of demonstration.

It will be appreciated that the tricycle 200 may be designed such that when the user pulls the back support 196 to the maximum height possible, the position of the bottom frames 235 relative to the front frame 130 changes from the position demonstrated by lines 1311 to the position demonstrated by lines 1312.

Figure 14:
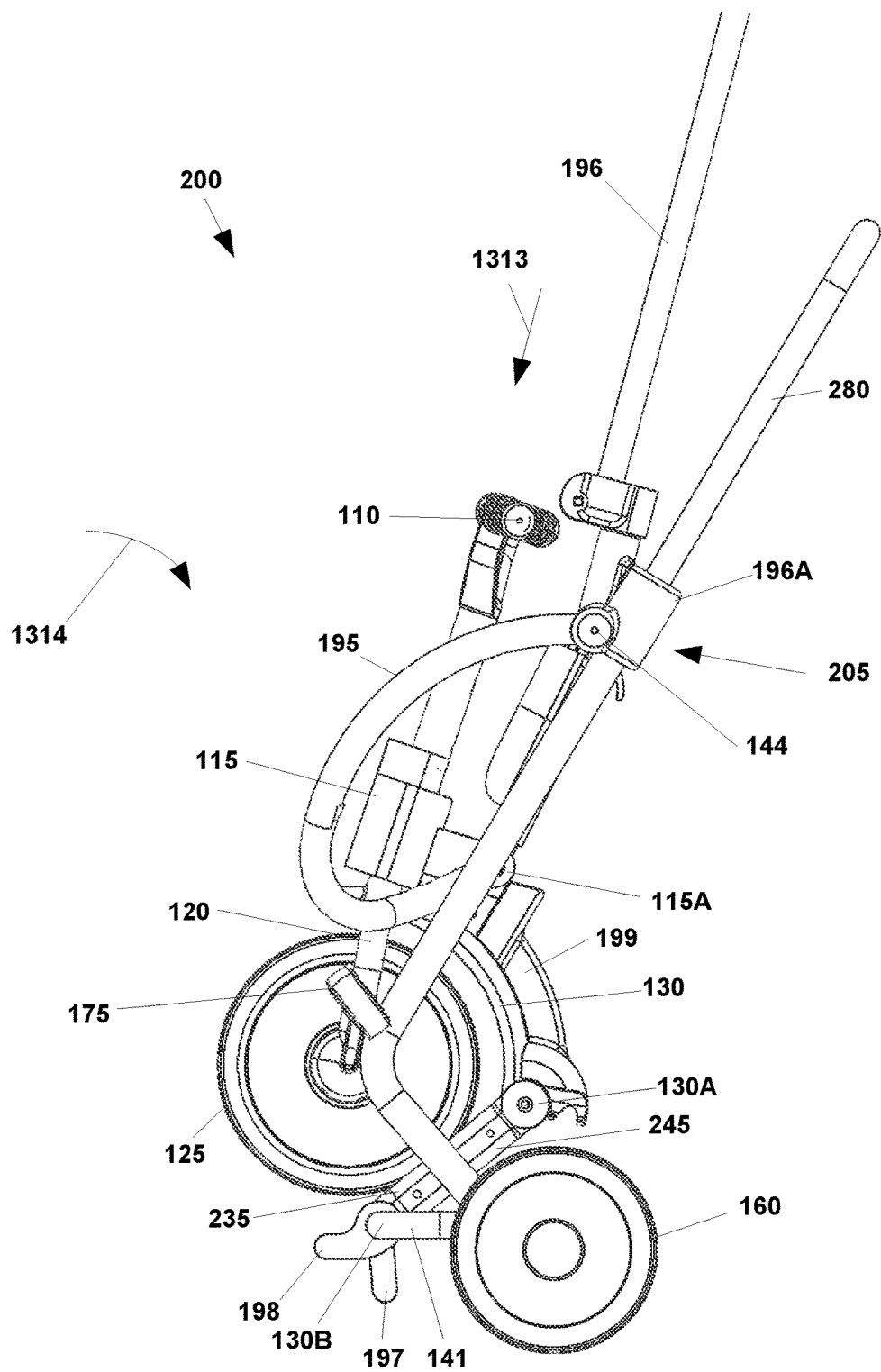

FIG. 14 is a side view of tricycle 200 demonstrating the continuation of the folding process. When the position of the bottom frames 235 relative to the front frame 130 changes from the position demonstrated by lines 1311 to the position demonstrated by lines 1312, the user may return the back support 196 in the direction of arrow 1313 thus allowing sliding parts 196A to slide down on the parent bar 280 and causing the front wheel 125 to move in the direction of arrow 1314.

Figure 15:
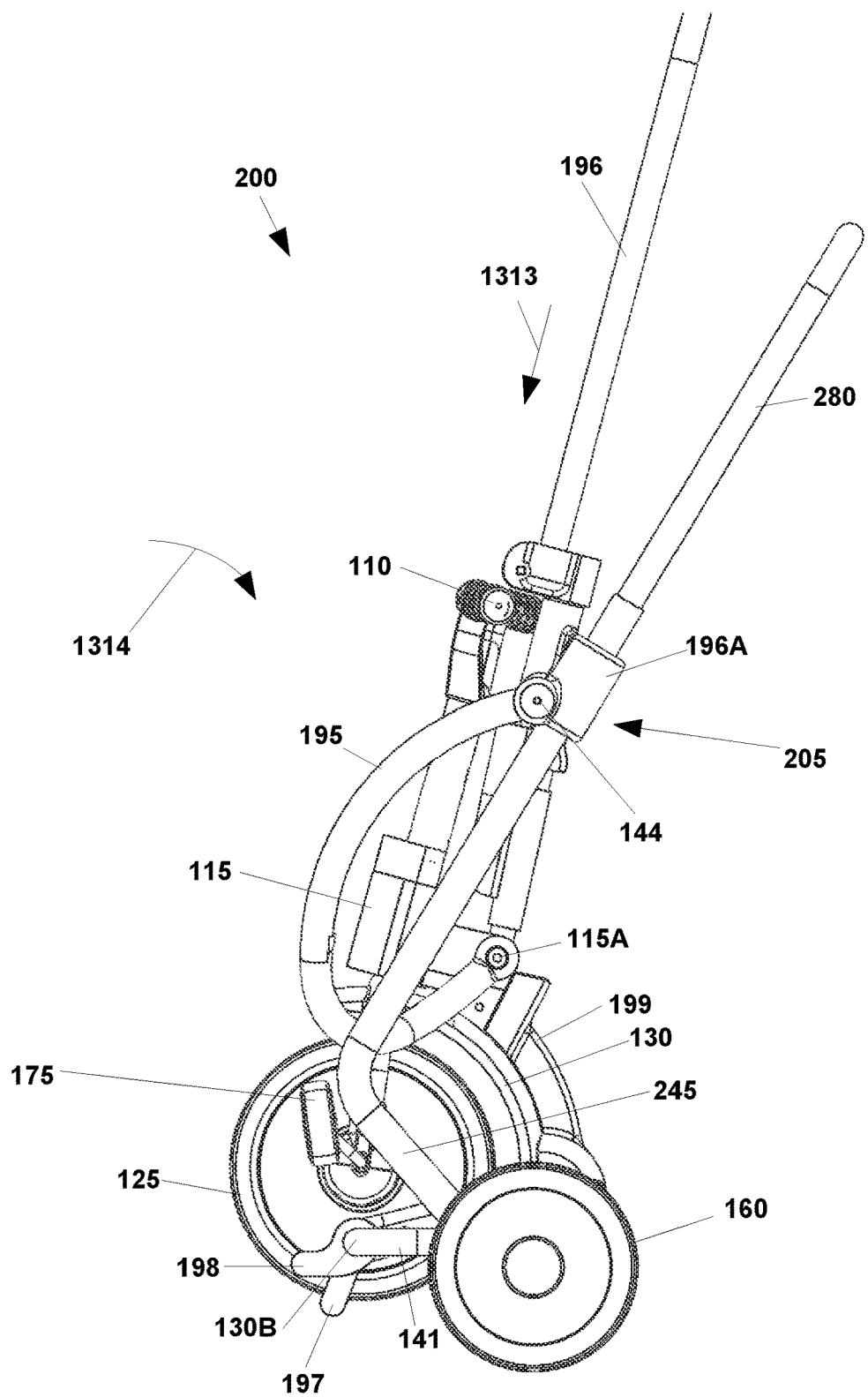

FIG. 15 is a side view of tricycle 200 demonstrating the continuation of the folding process. While the user keeps returning the back support 196 in the direction of arrow 1313, sliding parts 196A slide down on the parent bar 280 and cause the front wheel 125 to move in the direction of arrow 1314 and in between the rear wheels 160 (only one is shown). According to embodiments of the present disclosure, as can be seen, the bottom supports 197 support the tricycle 200 in the folded position.

As mentioned above, it will be appreciated that the back support 196 is optional and only presented for the purpose of demonstration. According to embodiments of the present disclosure, if the back support 196 does not exist, the user may use e.g. the seat 155 in order to pull sliding parts 196A in the direction of arrow 1211 and start the folding process.

According to embodiments of the present disclosure the folding process may be now completed, e.g., in a case where the back support 196 does not exist.

Figure 16:
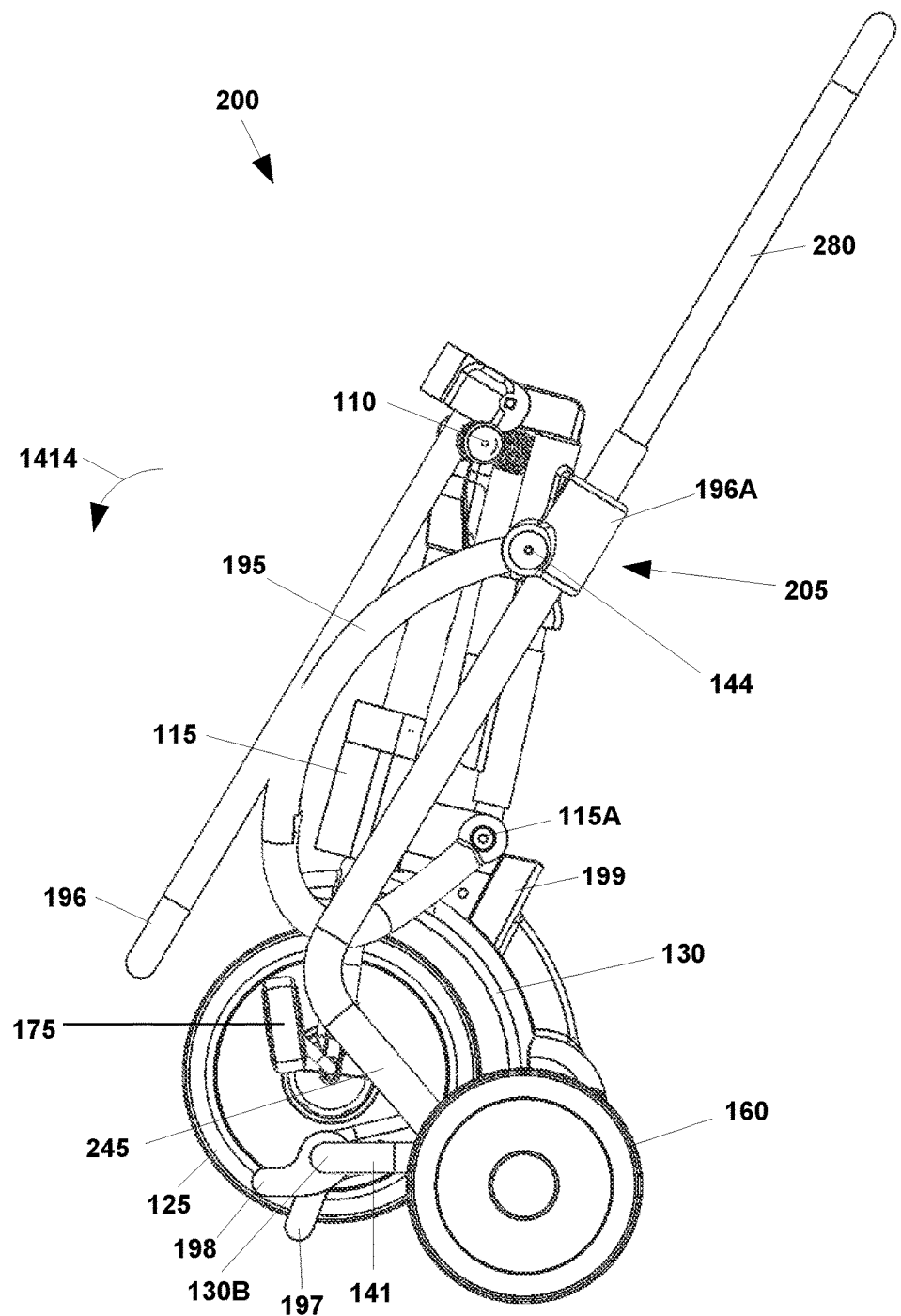

In a case where the back support 196 does exist, the user may fold it in the direction of arrow 1414 as demonstrated in FIG. 16.

Figure 17:
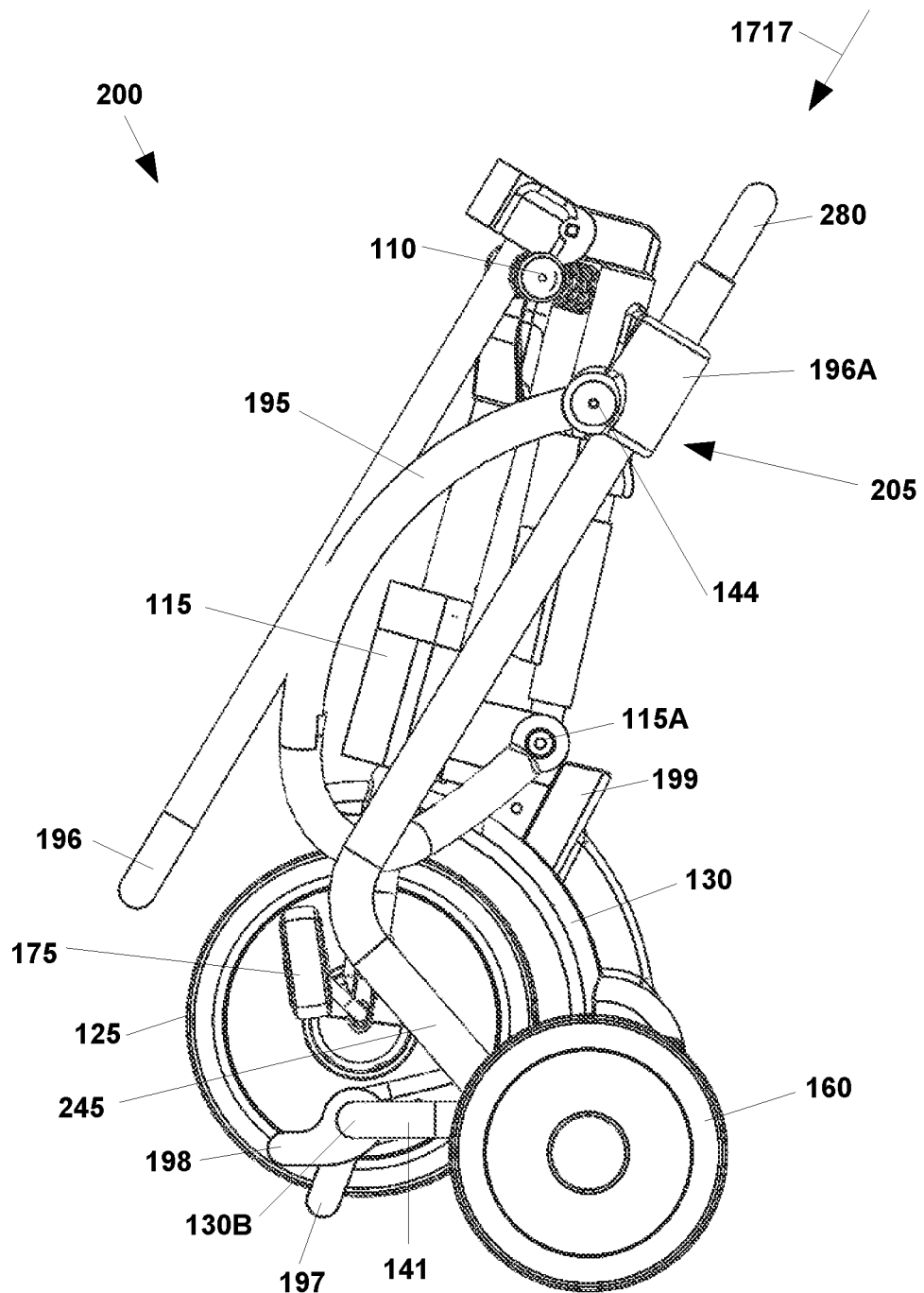

The user may also push the parent bar 280 in the direction of arrow 1717 as demonstrated in FIG. 17.

Figure 18:
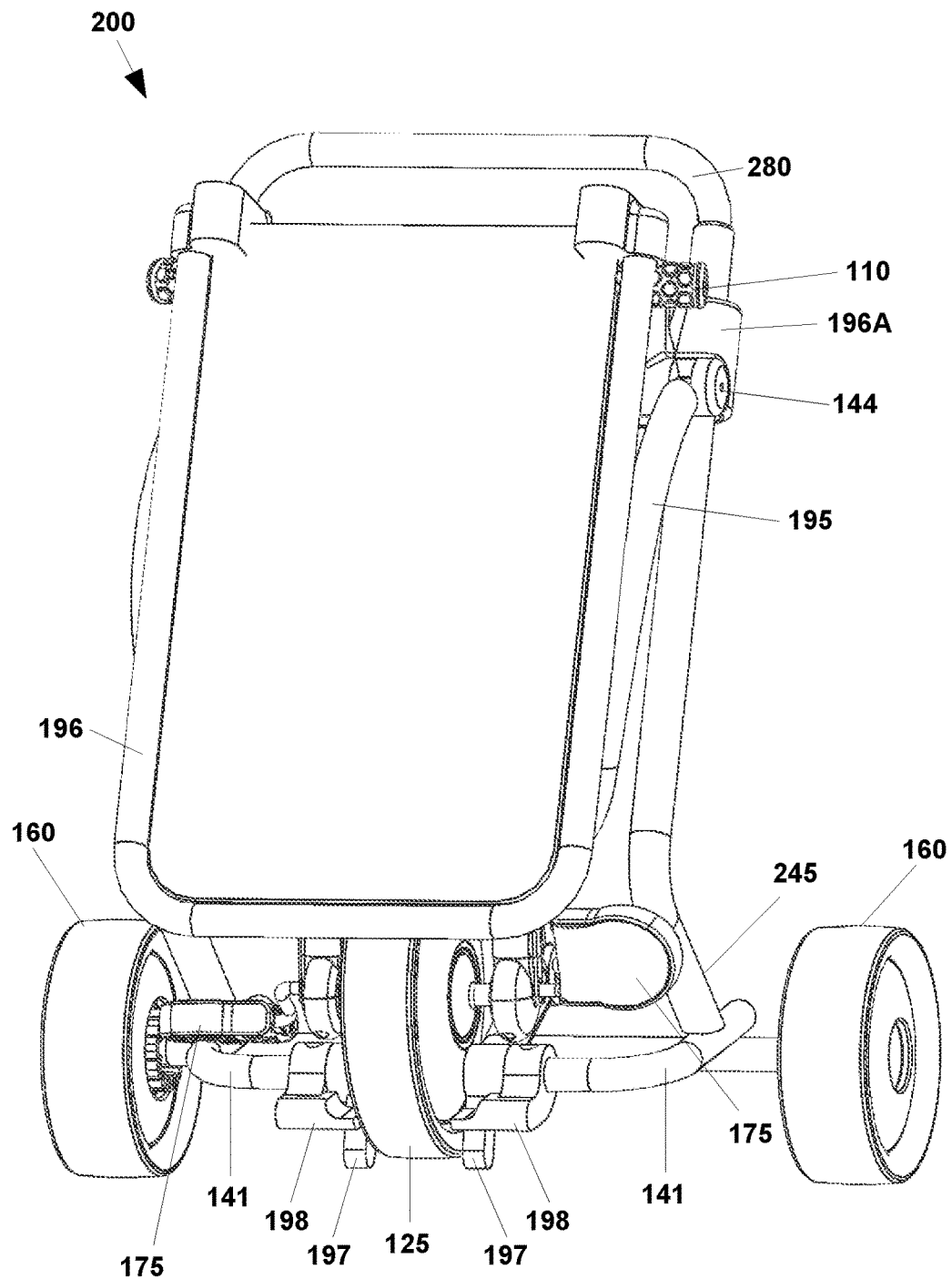
FIG. 18 is a front perspective view of the tricycle of FIG. 11 at the end of the folding process according to embodiments of the present disclosure.

FIG. 18 is a front perspective view of the tricycle 200 at the end of the folding process according to embodiments of the present disclosure.

It will be appreciated that the tricycle 200 is designed to enable the folding of the back support 196 over and to the front side of the handlebar 110.

According to embodiments of the present disclosure, the locking mechanism 205 may be used for locking the tricycle 200 in the folded position.

It will be appreciated that in order to unfold the tricycle 200, the user may perform the same instructions in reverse order while he pulls the handlebar 110 outwardly.

According to embodiments of the present disclosure, the front bearing member 115 and the wheel fork 120 may be connected via a swivel mechanism. The swivel mechanism enables a steering state where a rider may move the front wheel 125 using the handlebar 110, and a swivel state where the handlebar 110 is detached from the wheel fork 120 and the wheel may move freely.

Figure 19:
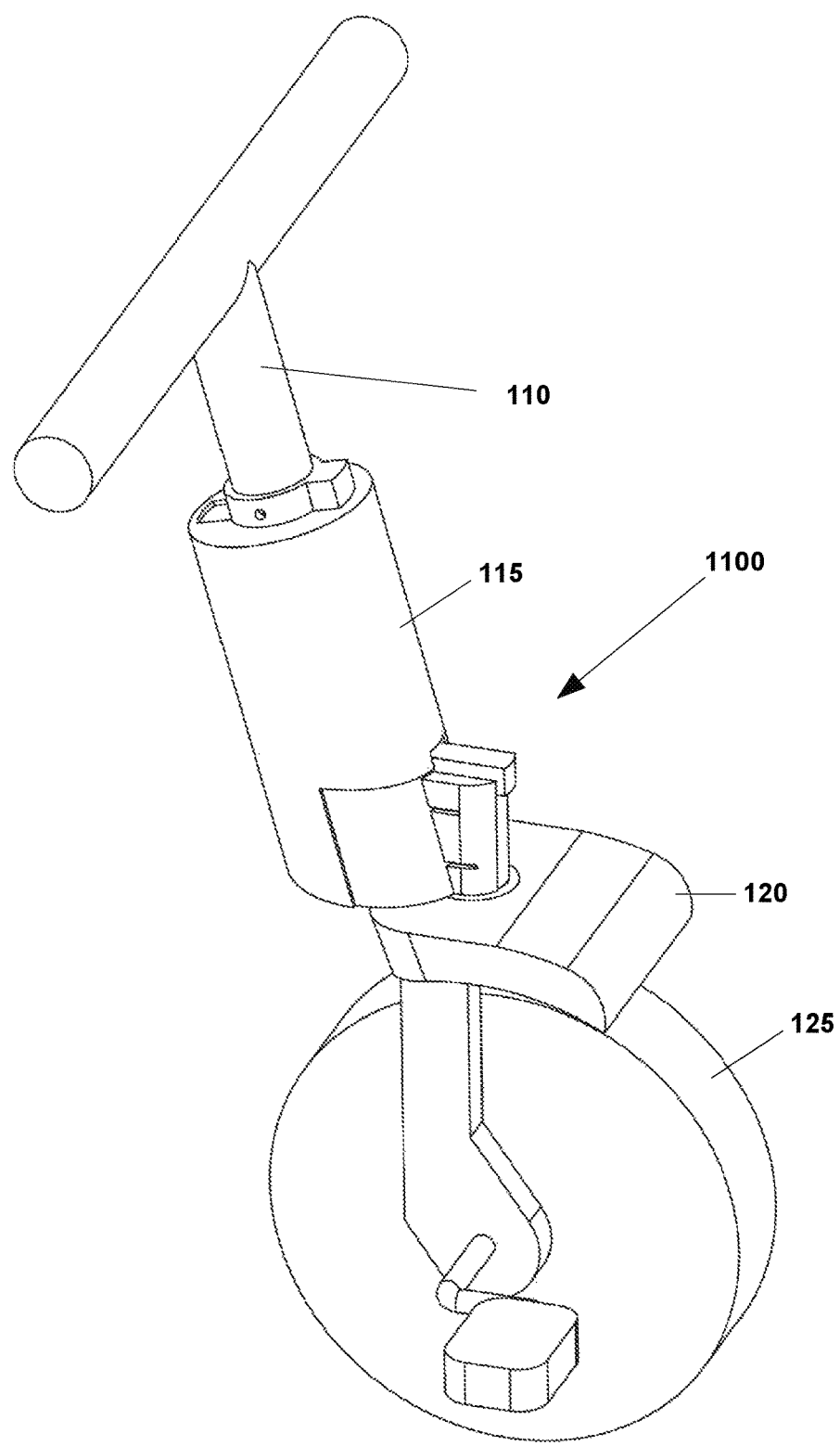
FIG. 19 is a perspective view of the tricycle's front part including the swivel mechanism in a swivel state, according to embodiments of the present disclosure.

FIG. 19 is a perspective view of the tricycle's 100 or 200 front part including a swivel mechanism 1100 in a swivel state, according to embodiments of the present disclosure.

Figure 19A:
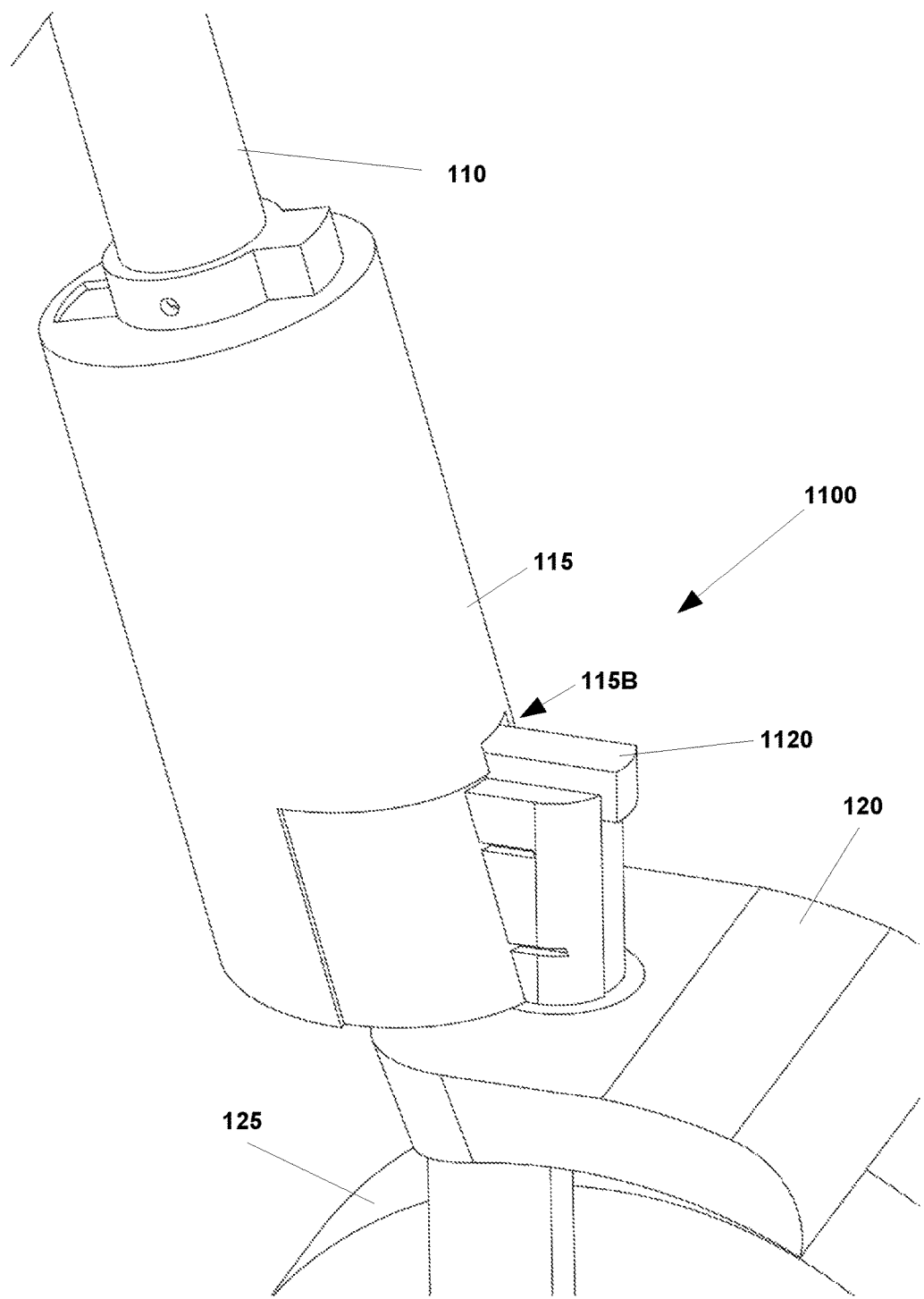
FIG. 19A is a close up view of the tricycle's front part including the swivel mechanism in a swivel state.

FIG. 19A is a close up view of the tricycle's 100 or 200 front part including the swivel mechanism 1100 in a swivel state.

Figure 19B:
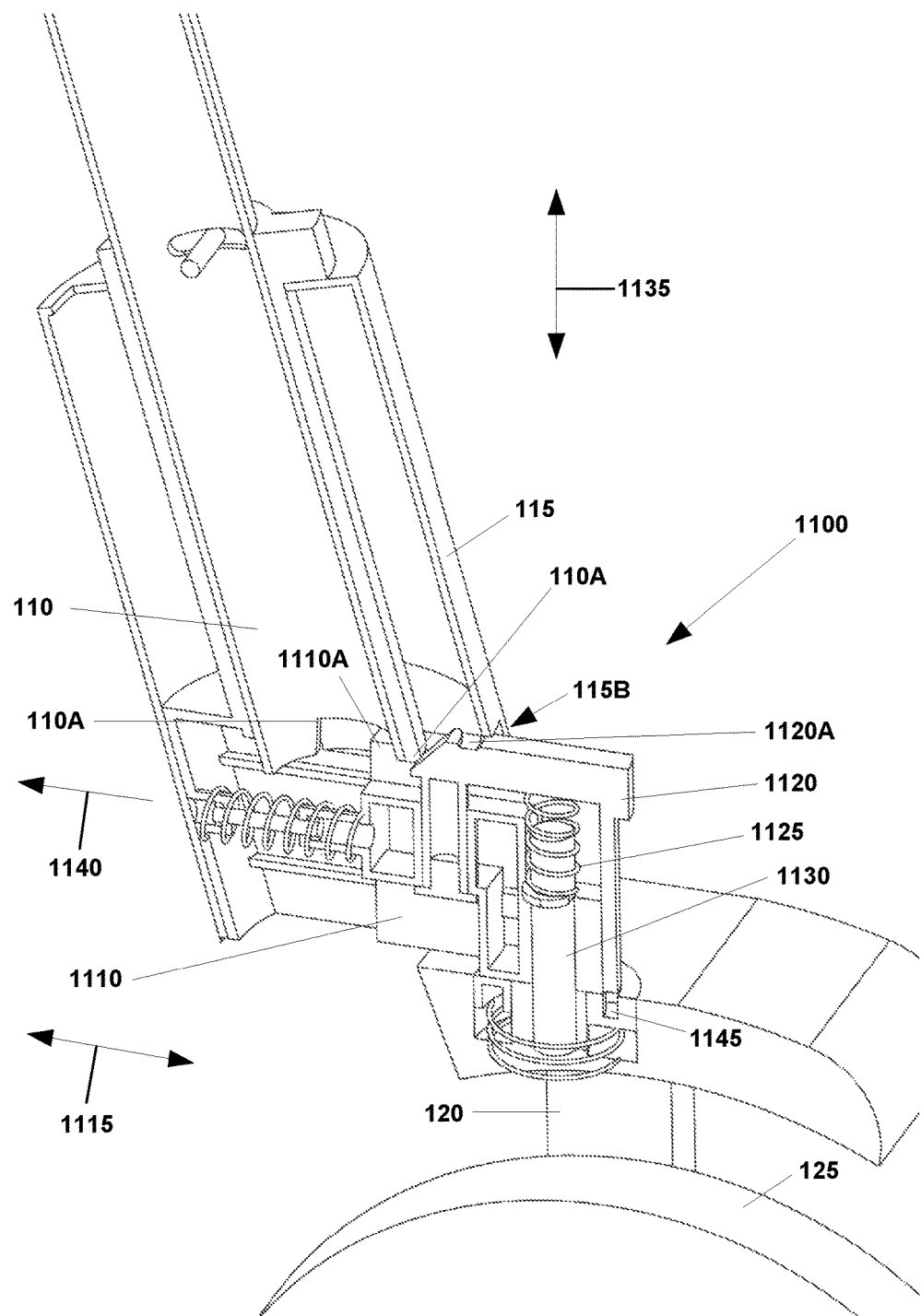
FIG. 19B is a schematic section cut of FIG. 19A showing an inner view of the swivel mechanism 1100 in a swivel state.

FIG. 19B is a schematic section cut of FIG. 19A showing an inner view of the swivel mechanism 1100 in a swivel state. The swivel mechanism 1100 includes a mechanism part 1110 intended to be moved in the directions of the dual head arrow 1115 in order to change states (swivel or steering). In the presented position (swivel state), the mechanism part 1110 is detached from the handlebar 110 and the wheel fork 120 thus enables the handlebar 110 to move freely and the wheel 125 to swivel freely. The mechanism part 1110 includes a push button 1120 intended to lock the states. When the swivel mechanism is in swivel state, the push button 1120 is caught in the depression 115B of the front bearing member 115 (also shown in FIG. 19A). Spring 1125 mounted between the push button 1120 and rod 1130 enables the push button 1120 to move in the directions of the dual head arrow 1135 while maintaining the push button 1120 as high as possible. As will be shown in FIG. 20B, in order to change from swivel state to steering state, the user pushes the push button 1120 down and in the direction of arrow 1140. When the push button 1120 is pushed down, it is inserted into the depression 1145 of the wheel fork 120 thus securing the push button 1120 to the wheel fork 120. Then, when the push button 1120 is moved in the direction of arrow 1140, its depression 1120A and the mechanism part's rear end 1110A are caught in the bottom end 110A of the handlebar 110 thus coupling the handlebar 110 to the front wheel 125 and enabling steering.

Figure 20:
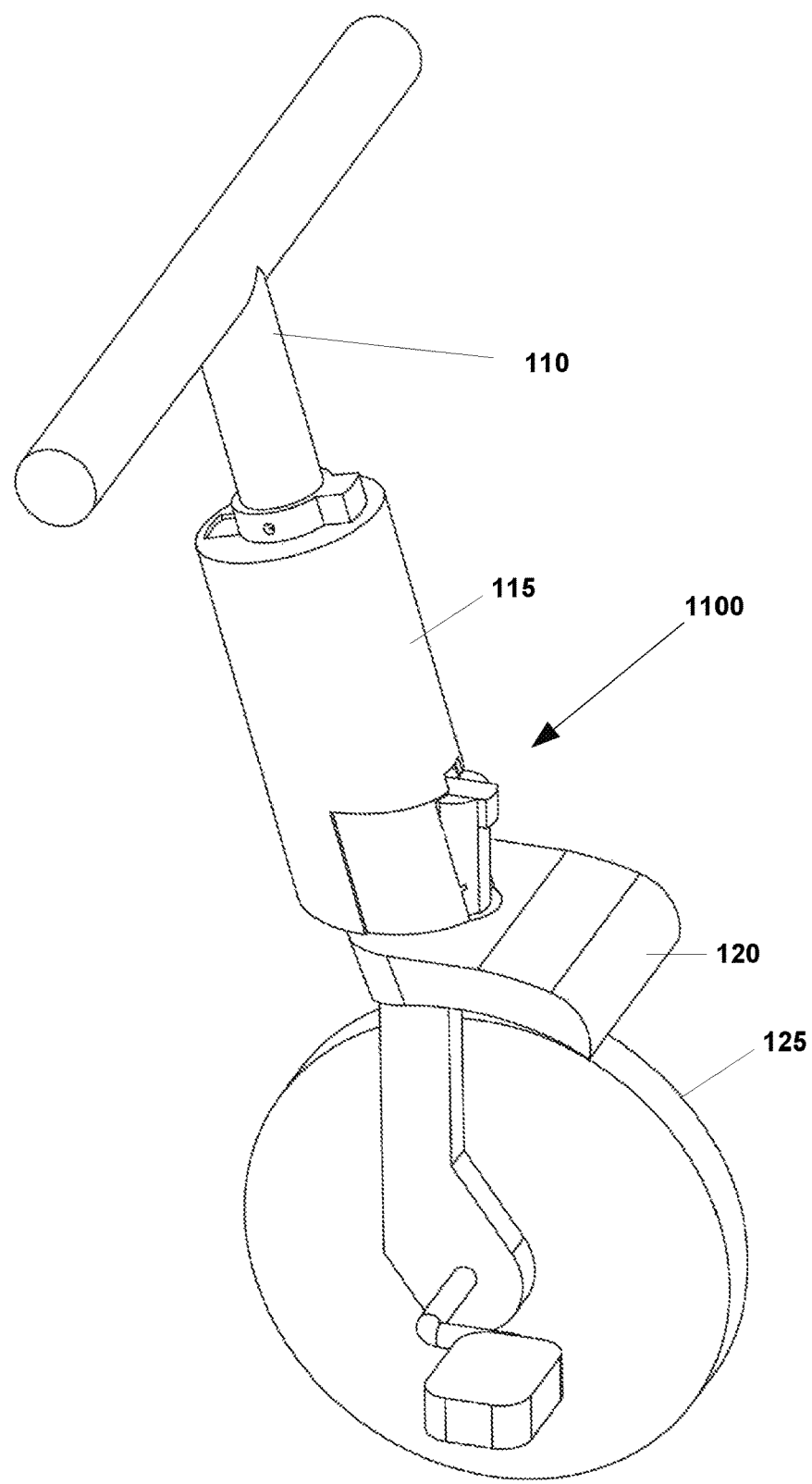
FIG. 20 is a perspective view of the tricycle's front part including the swivel mechanism 1100 in a steering state, according to embodiments of the present disclosure.

FIG. 20 is a perspective view of the tricycle's 100 or 200 front part including the swivel mechanism 1100 in a steering state, according to embodiments of the present disclosure.

Figure 20A:
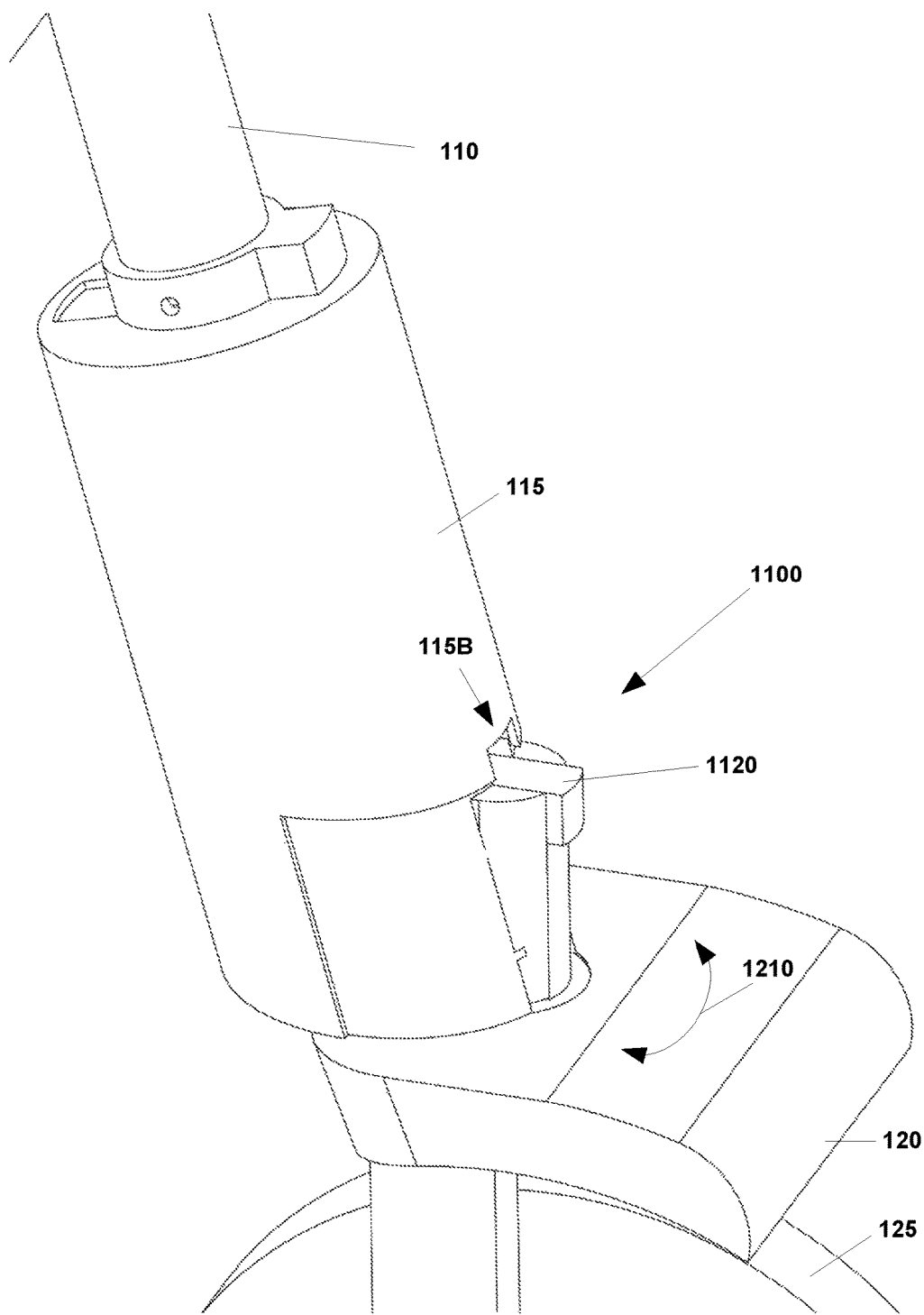
FIG. 20A is a close up view of the tricycle's front part including the swivel mechanism 1100 in a steering state.

FIG. 20A is a close up view of the tricycle's 100 or 200 front part including the swivel mechanism 1100 in a steering state. In steering state, the push button 1120 is released from the depression 115B and coupled to the handlebar 110 thus enabling a rider to steer the front wheel 125 in the directions of the dual head arrow 1210. According to embodiments of the disclosure, the steering may be limited by the front bearing member 115.

Figure 20B:
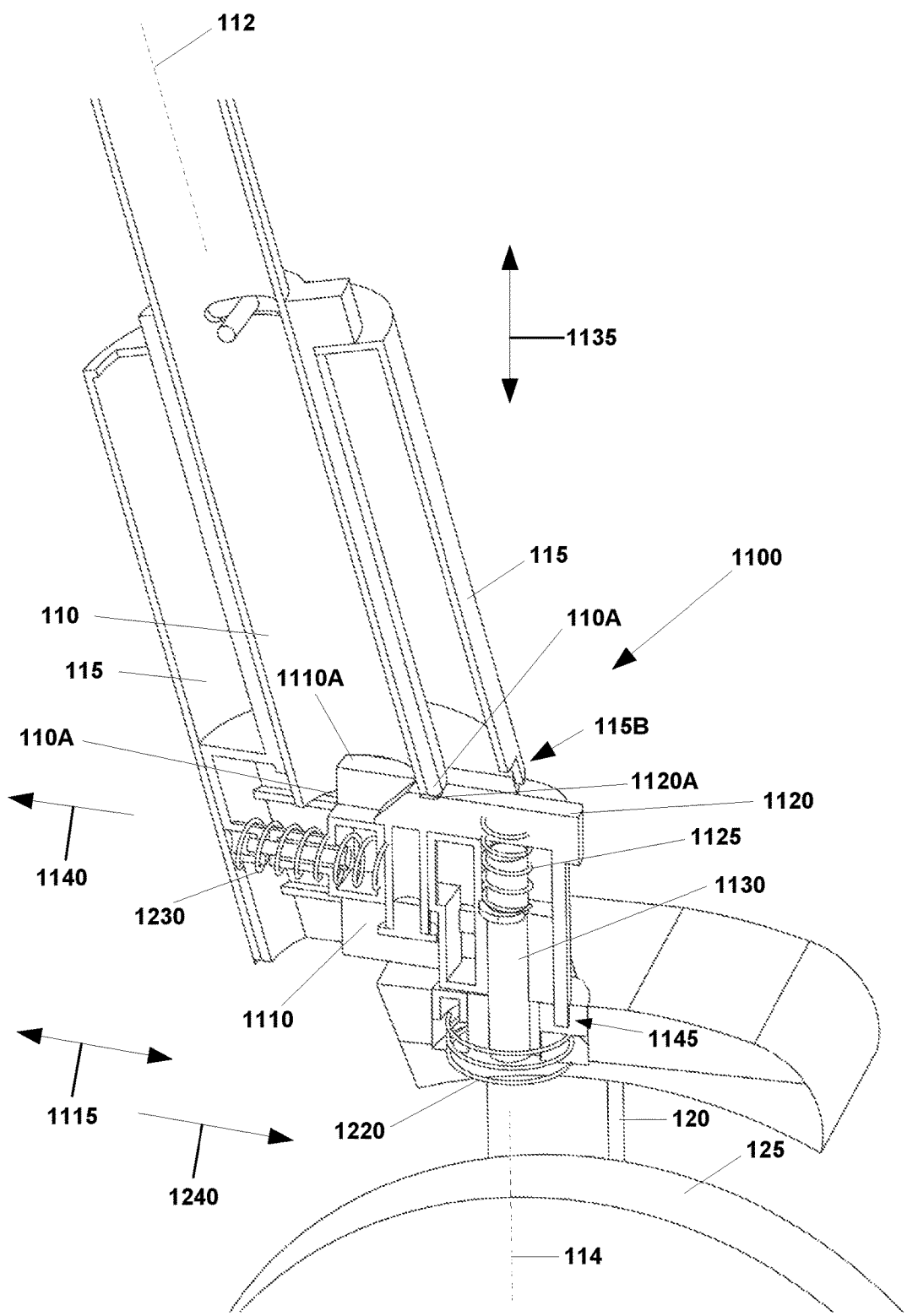
FIG. 20B is a schematic section cut of FIG. 20A showing an inner view of the swivel mechanism 1100 in a steering state.

FIG. 20B is a schematic section cut of FIG. 20A showing an inner view of the swivel mechanism 1100 in a steering state. As explained above in conjunction with FIG. 19B, when the user changes from swivel state to steering state, he pushes the push button 1120 down and in the direction of arrow 1140 thus when the push button 1120 is pushed down, it is inserted into the depression 1145 of the wheel fork 120 and secures the push button 1120 to the wheel fork 120, and when the push button 1120 is moved in the direction of arrow 1140, its depression 1120A and the mechanism part's rear end 1110A are caught in the bottom end 110A of the handlebar 110, couple the handlebar 110 to the front wheel 125 and enable steering. When the user wishes to change to swivel state, he pushes the push button 1120 down. Spring 1220 enables part 1125 to be pushed down thus enabling the releasing of depression 1120A from the bottom end 110A of the handlebar 110 and spring 1230, mounted between the front bearing member 115 and the push button 1120 pushes the push button 1120 out in the direction of arrow 1240. It will be appreciated that the handlebar 110 rotation axis 112 and the front wheel 125 swivel rotation axis 114 are different axes.

According to embodiments of the present disclosure, in swivel state, the front wheel 125 swivel rotation axis 114 is perpendicular, or at least essentially perpendicular, to the ground.

According to embodiments of the present disclosure, in steering state, the front wheel 125 steering rotation axis is the handlebar rotation axis 112.

It will be appreciated that the wheel fork's 120 shape is not limited to the shape presented in FIG. 19 to FIG. 20B.

Figure 21:
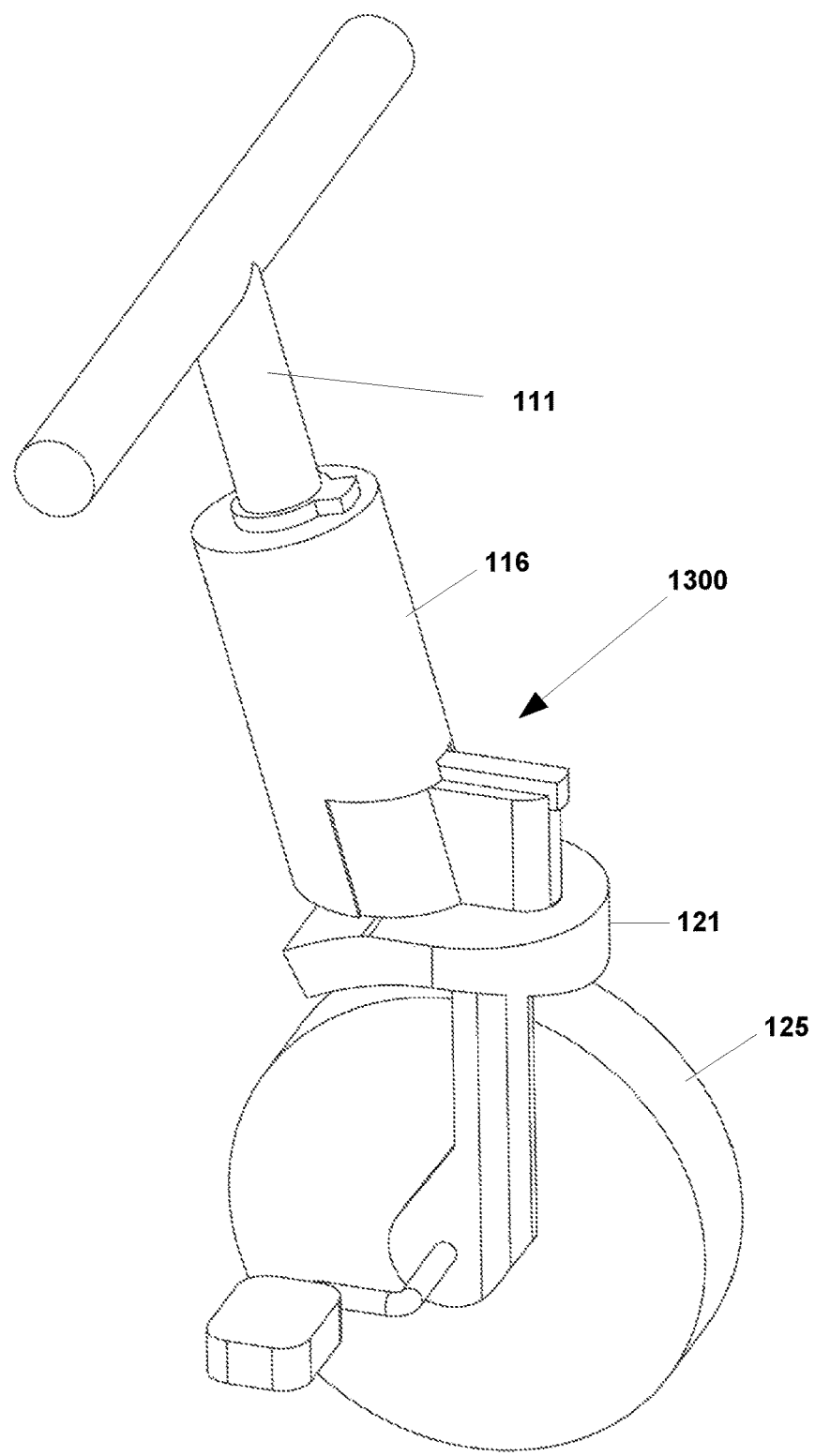
FIG. 21 is a perspective view of the tricycle's front part including another swivel mechanism 1300 in a swivel state, according to embodiments of the present disclosure.

FIG. 21 is a perspective view of the tricycle's 100 or 200 front part including another swivel mechanism 1300 in a swivel state, according to embodiments of the present disclosure.

Figure 21A:
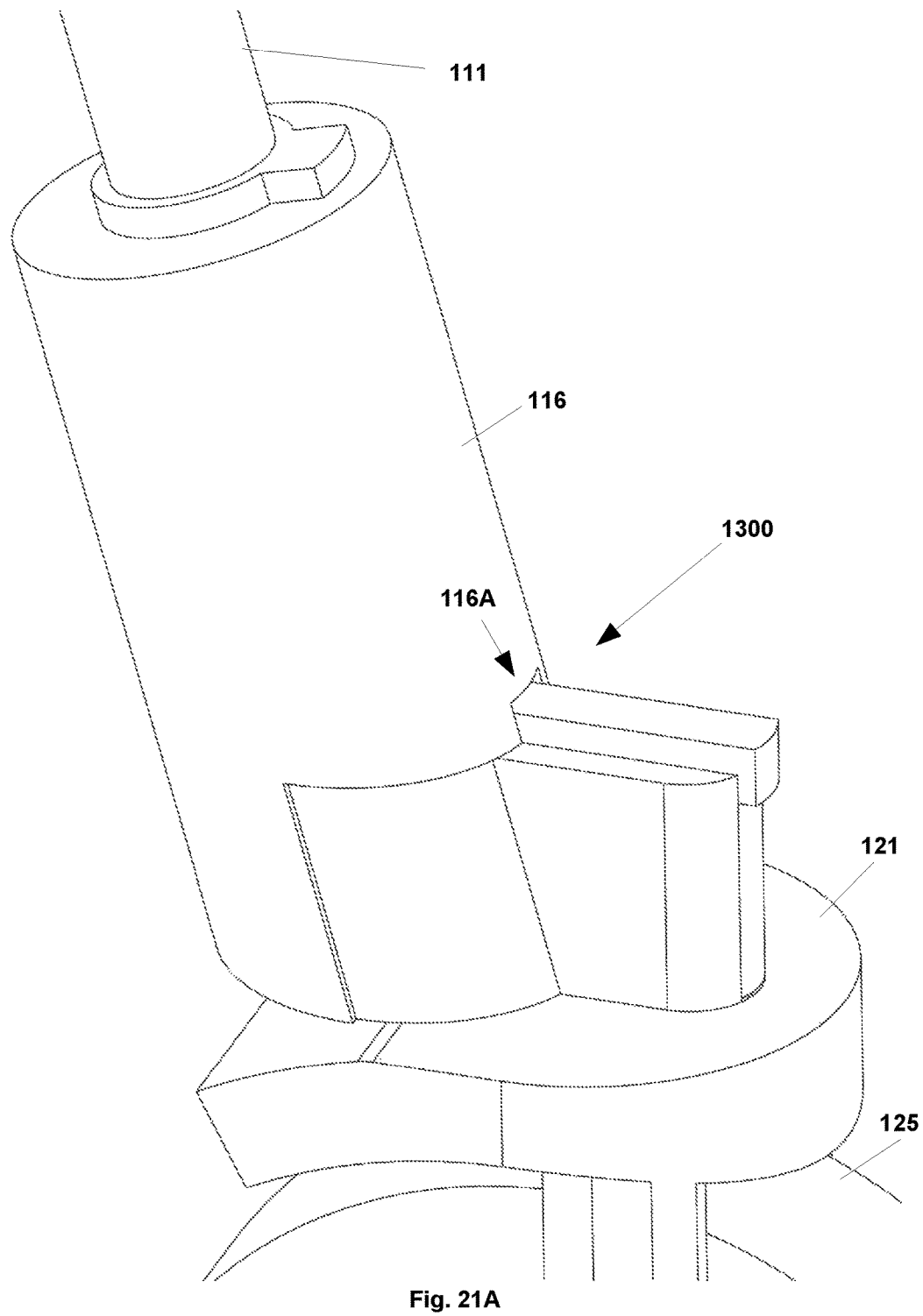
FIG. 21A is a close up view of the tricycle's front part including the swivel mechanism 1300 in a swivel state.

FIG. 21A is a close up view of the tricycle's 100 or 200 front part including the swivel mechanism 1300 in a swivel state.

FIG. 21A is a schematic section cut of FIG. 21A showing an inner view of the swivel mechanism 1300 in a swivel state. The swivel mechanism 1300 includes a push button 1310 intended to be moved in the directions of the dual head arrow 1315 in order to change states (swivel or steering). In the presented position (swivel state), the push button 1310 is detached from the handlebar 111 and the wheel fork 121 and its rear end 1310A is aligned with a slit 111C thus enabling the handlebar 111 to move freely and the wheel 125 to swivel freely. The push button 1310 is intended to lock the states. In order to do so, the push button 1310 includes a protrusion 1320 intended to be caught in the upper depression 1325 in swivel state and in the lower depression 1330 in steering state. When the push button 1310 is in swivel state, the protrusion 1320 is caught in the upper depression 1325 and its upper part 1310B is caught in the depression 116A of the front bearing member 116 (also shown in FIG. 21A). As will be shown in FIG. 22B, in order to change from swivel state to steering state, the user pushes the push button 1310 down and the protrusion 1320 is pushed into the depression 1330 of the wheel fork 121. Moreover, the push button's rear end 1310A is caught in the bottom end 111D of the handlebar 111 thus securing the push button 1310 to the wheel fork 121 and coupling the handlebar 111 to the front wheel 125 and enabling steering.

Figure 22:
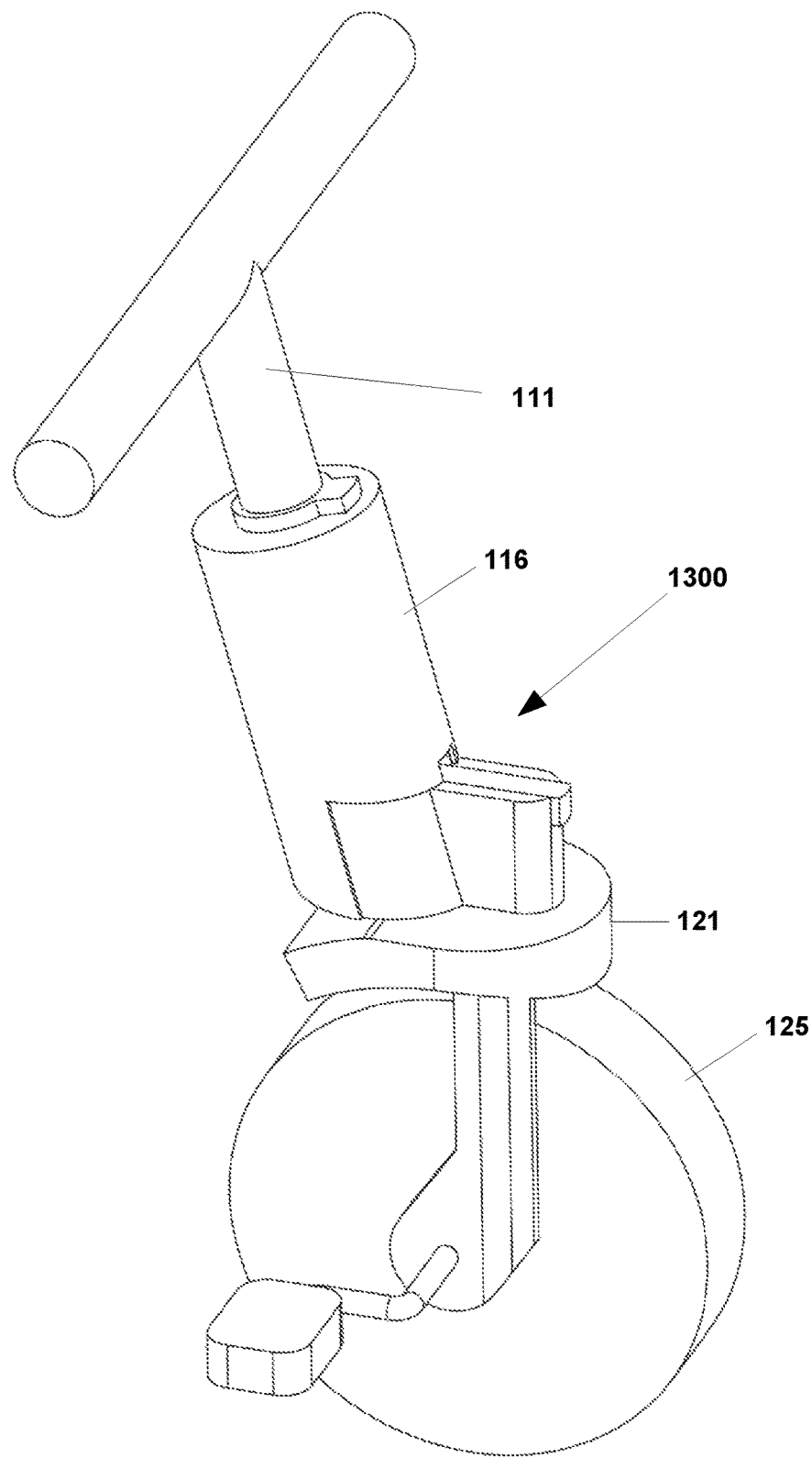
FIG. 22 is a perspective view of the tricycle's front part including the swivel mechanism 1300 in a steering state, according to embodiments of the present disclosure.

FIG. 22 is a perspective view of the tricycle's 100 or 200 front part including the swivel mechanism 1300 in a steering state, according to embodiments of the present disclosure.

Figure 22A:
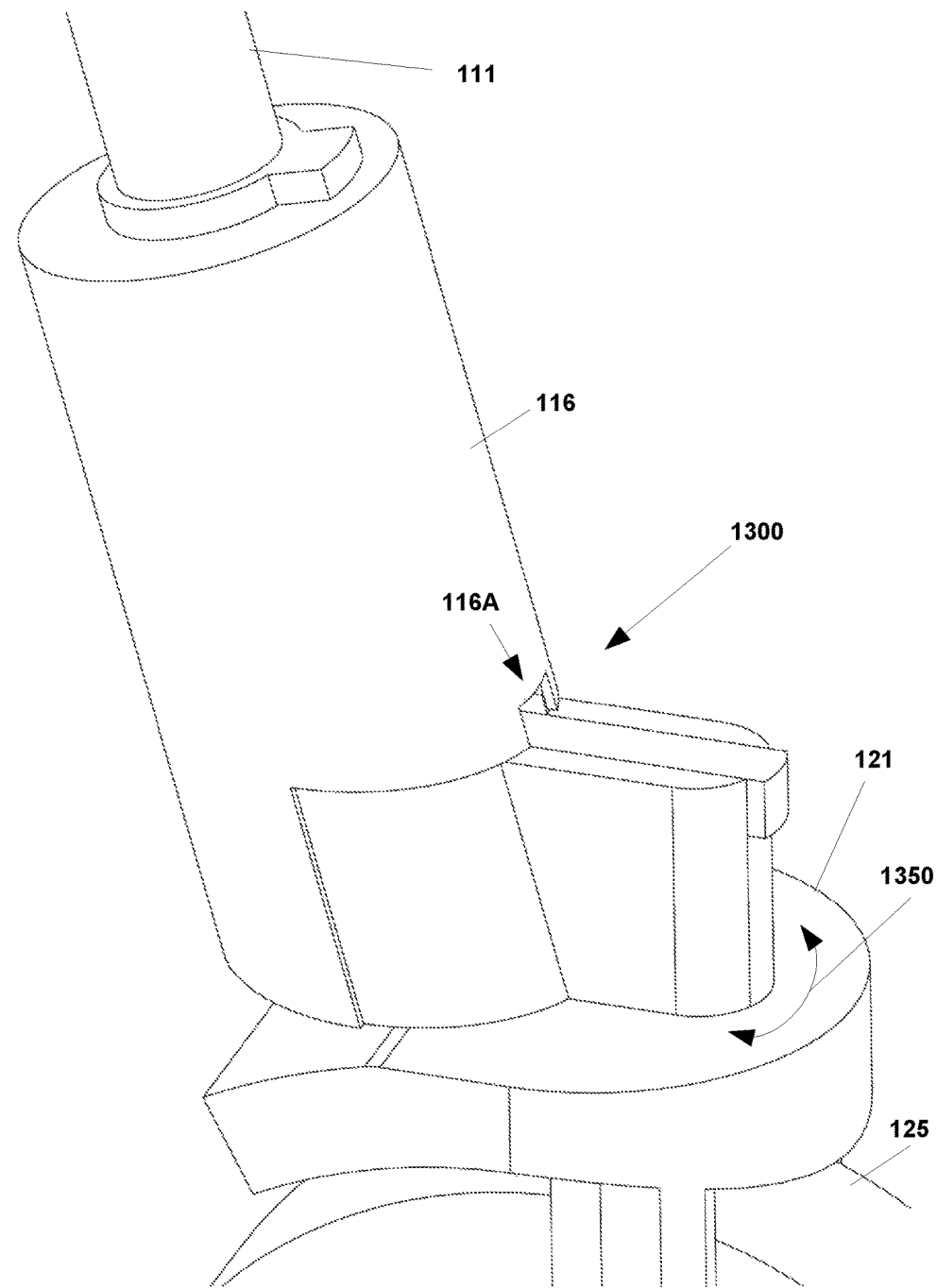
FIG. 22A is a close up view of the tricycle's front part including the swivel mechanism 1300 in a steering state.

FIG. 22A is a close up view of the tricycle's 100 or 200 front part including the swivel mechanism 1300 in a steering state. In steering state, the push button 1310 is released from the depression 116A and coupled to the handlebar 111 thus enabling a rider to steer the front wheel 125 in the directions of the dual head arrow 1350. According to embodiments of the disclosure, the steering may be limited by the front bearing member 116.

Figure 21B:
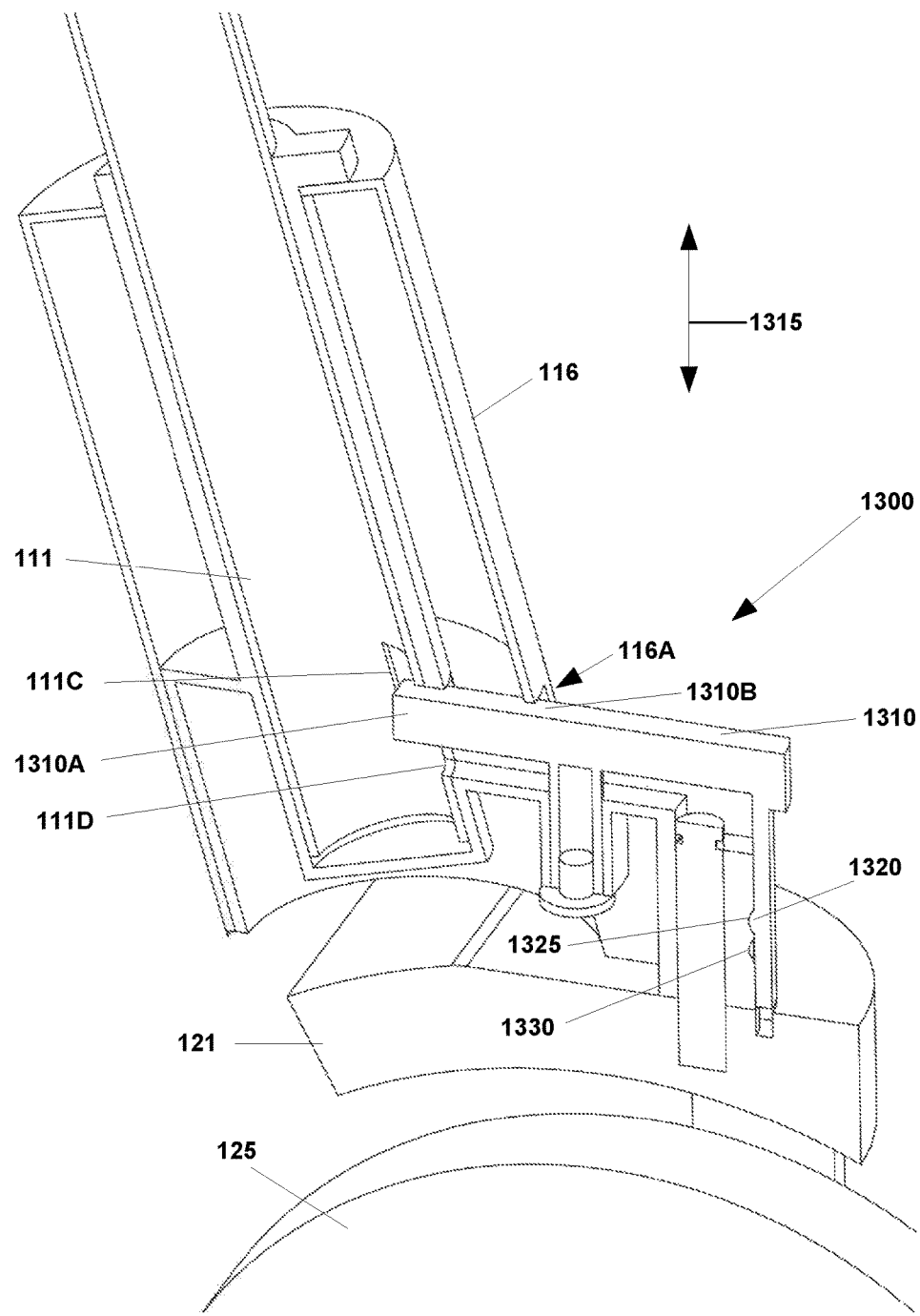
FIG. 21B is a schematic section cut of FIG. 21A showing an inner view of the swivel mechanism 1300 in a swivel state.
Figure 22B:
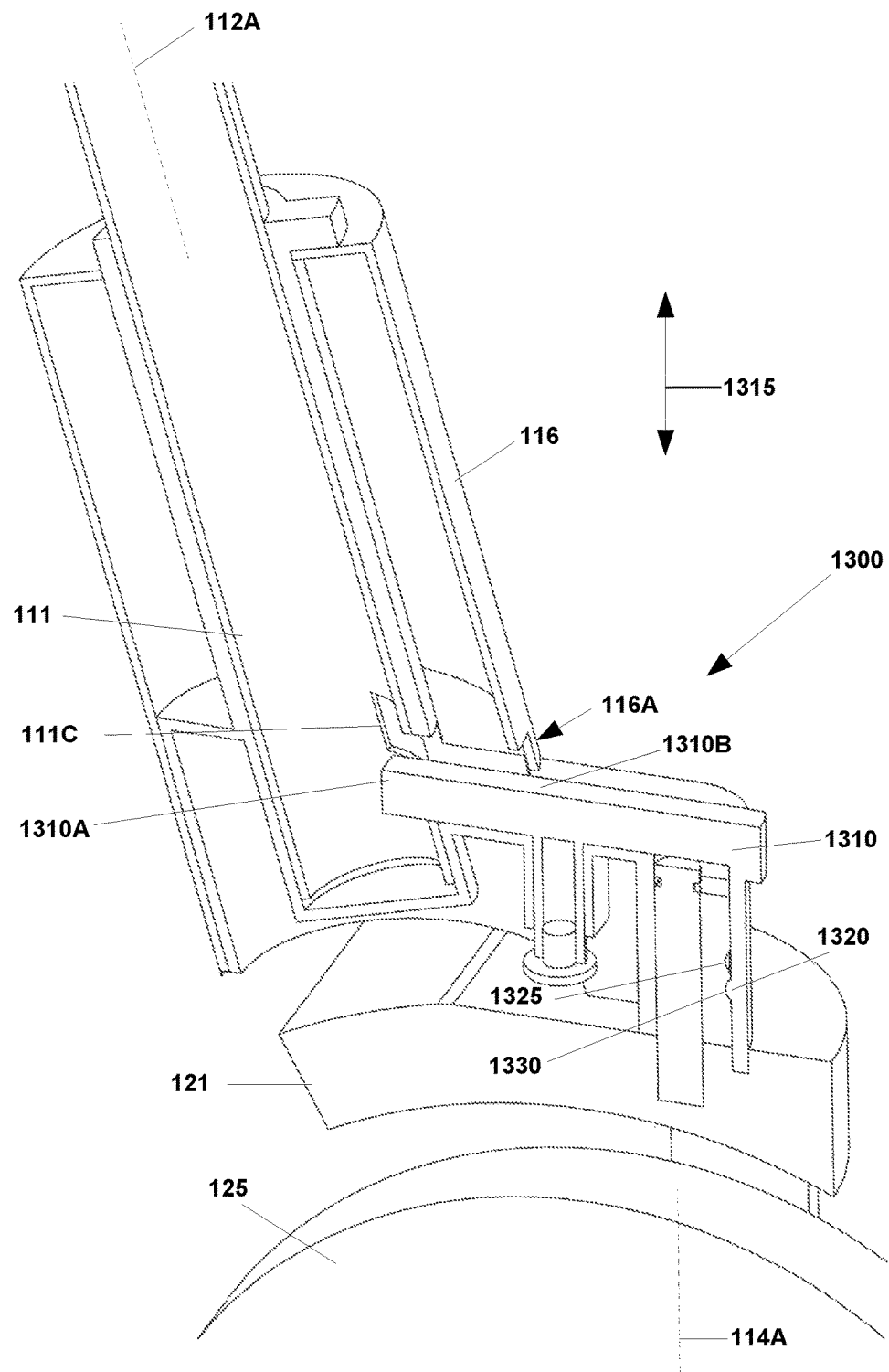
FIG. 22B is a schematic section cut of FIG. 22A showing an inner view of the swivel mechanism 1300 in a steering state.

FIG. 22B is a schematic section cut of FIG. 22A showing an inner view of the swivel mechanism 1300 in a steering state. As explained above in conjunction with FIG. 21B, when the user changes from swivel state to steering state, he pushes the push button 1310 down thus pushing the protrusion 1320 from the upper depression 1325 to the lower protrusion 1330 and securing the push button 1310 to the wheel fork 121. Moreover, when he pushes the push button 1310 down, he places the push button's rear end 1310A in the bottom end of the handlebar 111 thus coupling the handlebar 111 to the front wheel 125 and enabling steering. When the user wishes to change to swivel state, he pulls the push button 1310 up thus pulling the protrusion 1320 from the lower depression 1330 to the upper protrusion 1325 and releasing the push button 1310 from the wheel fork 121, and aligning the rear end 1310A of the push button 1310 with the slit 111C thus enabling the handlebar 111 to move freely and the wheel 125 to swivel. It will be appreciated that the handlebar 111 rotation axis 112A and the front wheel 125 swivel rotation axis 114A are different axes.

According to embodiments of the present disclosure, in swivel state, the front wheel 125 swivel rotation axis 114A is perpendicular, or at least essentially perpendicular, to the ground.

According to embodiments of the present disclosure, in steering state, the front wheel 125 steering rotation axis is the handlebar rotation axis 112A.

It will be appreciated that the wheel fork's 121 shape is not limited to the shape presented in FIG. 21 to FIG. 22B.

It will be appreciated that the slit 111C may have different sizes to provide different rotation limitations.

According to embodiments of the present disclosure, the swivel mechanisms described in conjunction with FIG. 19 to FIG. 22B may allow the front wheel to rotate in 360 degrees or in limited rotation angles.

According to embodiments of the present disclosure, the swivel mechanisms described in conjunction with FIG. 19 to FIG. 22B may be installed in known in the art tricycles and are not limited to be installed in the folding tricycle of the present disclosure.

It will be appreciated that, in both swivel mechanisms described above, the distance between the front wheel and the rear wheels in swivel state is at least the same, if not greater than, the distance between the front wheel and the rear wheels in steering state.

It will be appreciated that the folding mechanism described above is not limited to be installed in tricycles. For example, the folding mechanism may be installed in bicycles. In such a case, the anchor shape may be different in order to provide a stable basis for the bicycle to fold on.

It will be appreciated by persons skilled in the art that the present disclosure is not limited to what has been particularly shown and described hereinabove. Rather the scope of the present disclosure is defined by the appended claims and includes combinations and sub-combinations of the various features described hereinabove as well as variations and modifications thereof which would occur to persons skilled in the art upon reading the foregoing description.

The invention claimed is:

1. A folding tricycle, comprising:
   a first rear frame rotatably connected on a first end thereof with a first end of a first bottom frame;
   a second rear frame rotatably connected on a first end thereof with a first end of a second bottom frame;
   said first rear frame rotatably connected on a second end thereof with a first rear wheel;
   said second rear frame rotatably connected on a second end thereof with a second rear wheel;
   said first and second bottom frames rotatably connected on second ends thereof with a first end of a front frame;
   a seat frame rotatably connected on a front end thereof with one of a second end of said front frame and a front bearing member;
   a front wheel connected with a handlebar through one of said front frame and said front bearing member;
   first and second support frames connected respectively on first ends thereof with said first and second rear frames and configured to stabilize said tricycle in an unfolded position; and a locking mechanism configured to lock said tricycle in an unfolded position;

said tricycle is configured to be folded into a position where said front wheel is positioned in between said first and second rear wheels.

2. The folding tricycle of claim 1, further comprising first and second anchors;

said first and second anchors fixed respectively relative to said first and second support frames;

said first rear frame, said first support frame, said first anchor and said first bottom frame are connected to each other on first ends thereof thereby creating a first folding mechanism;

said second rear frame, said second support frame, said second anchor and said second bottom frame are connected to each other on first ends thereof thereby creating a second folding mechanism;

said first and second support frames are connected on second ends thereof with said locking mechanism;

each one of said first and second folding mechanisms is configured to:
a. position its bottom frame in a fixed position relative to its rear frame when said locking mechanism secures a locking frame to one of a rear end of said seat frame, and a seat connected with said seat frame; and
b. enable its bottom frame to move when said locking frame is detached from said rear end of said seat frame or said seat, and its respective anchor and locking frame touch the ground.

3. The folding tricycle of claim 2, wherein said first and second folding mechanisms are further configured to enable folding of said first and second rear wheels towards each other in order to minimize the overall dimensions of said tricycle.

4. The folding tricycle of claim 2, further comprising:
a wheel fork connected between said front wheel and said handlebar;
said wheel fork is connected with said handlebar through said one of said front frame and said front bearing member.

5. The folding tricycle of claim 1, wherein said handlebar is telescopic.

6. The folding tricycle of claim 1, further comprising two safety bars connected with said seat frame.

7. The folding tricycle of claim 1, further comprising at least one telescopic bar connected with one of said seat frame and a seat.

8. The folding tricycle of claim 7, further comprising a handle connected with said at least one telescopic bar.

9. The folding tricycle of claim 7, further comprising a canopy connected with said at least one telescopic bar.

10. A method of folding a folding tricycle, comprising:
a. providing the folding tricycle of claim 2;
b. detaching said locking frame from one of said rear end of said seat frame and said seat;
c. lowering said locking frame to the ground thereby lowering said first and second anchors to the ground; and
d. pulling said seat frame towards said first and second rear wheels, thereby placing said front wheel in between said first and second rear wheels; and pushing said seat frame towards said handlebar, thereby folding said seat towards said handlebar.

11. The folding tricycle of claim 1, further comprising two sliding parts rotatably connected with one of said seat frame and a seat; and a parent bar connected with a second end of said first and second support frames;

said locking mechanism connected with said sliding parts and further configured to secure said sliding parts to said parent bar in said unfolded position and release said sliding parts from said parent bar thereby enabling said sliding parts to slide along said parent bar and said tricycle to be folded into a position where said front wheel is positioned in between said first and second rear wheels.

12. The folding tricycle of claim 1, further comprising two rear supports, each fixed relative to its respective rear frame; each rear support intended to limit the movement of its respective bottom frame.

13. The folding tricycle of claim 1, further comprising a front support configured to limit the movement of said front frame relative to said seat frame and to fixate the angles between said first and second bottom frames and said front frame; and between said front frame and said seat frame thus creating a stable tricycle structure in said unfolded position.

14. A method of folding a folding tricycle, comprising:
a. providing the folding tricycle of claim 11;
b. unlocking said locking mechanism thereby releasing said sliding parts from said parent bar and enabling said sliding parts to slide along said parent bar;
c. sliding said sliding parts upwards along said parent bar up to a point where the angle between said first and second bottom frames and said front frame passes an over-center position; and
d. sliding said sliding parts downward along said parent bar.

15. A folding tricycle, comprising:
a first rear frame rotatably connected on a first end thereof with a first end of a first bottom frame;
a second rear frame rotatably connected on a first end thereof with a first end of a second bottom frame;
said first rear frame rotatably connected on a second end thereof with a first rear wheel;
said second rear frame rotatably connected on a second end thereof with a second rear wheel;
said first and second bottom frames rotatably connected on second ends thereof with a first end of a front frame;
a seat frame rotatably connected on a front end thereof with one of a second end of said front frame and a front bearing member;
a front wheel connected with a handlebar through one of said front frame and said front bearing member;
first and second support frames connected respectively on first ends thereof with said first and second rear frames and configured to stabilize said tricycle in an unfolded position; and,
a locking mechanism configured to lock said tricycle in an unfolded position, said locking mechanism operably securing one of a locking frame with said seat frame, and a parent bar with at least one sliding part;
wherein said tricycle is configured to be folded into a position where said front wheel is positioned in between said first and second rear wheels.

16. The folding tricycle of claim 15, further comprising first and second anchors;
said first and second anchors fixed respectively relative to said first and second support frames;
said first rear frame, said first support frame, said first anchor and said first bottom frame are connected to each other on first ends thereof thereby creating a first folding mechanism;

said second rear frame, said second support frame, said second anchor and said second bottom frame are connected to each other on first ends thereof thereby creating a second folding mechanism;

said first and second support frames are connected on second ends thereof with said locking mechanism;

each one of said first and second folding mechanisms is configured to:

(a) position its bottom frame in a fixed position relative to its rear frame when said locking mechanism secures said locking frame to one of a rear end of said seat frame, and a seat connected with said seat frame; and (b) enable its bottom frame to move when said locking frame is detached from said rear end of said seat frame or said seat, and its respective anchor and locking frame touch the ground.

17. The folding tricycle of claim 16, wherein said first and second folding mechanisms are further configured to enable folding of said first and second rear wheels towards each other in order to minimize the overall dimensions of said tricycle.

18. The folding tricycle of claim 16, further comprising: a wheel fork connected between said front wheel and said handlebar, said wheel fork is connected with said handlebar through said one of said front frame and said front bearing member.

19. The folding tricycle of claim 15, wherein said handlebar is telescopic.

20. The folding tricycle of claim 15, further comprising two safety bars connected with said seat frame.

21. The folding tricycle of claim 15, further comprising at least one telescopic bar connected with one of said seat frame and a seat.

22. The folding tricycle of claim 21, further comprising a handle connected with said at least one telescopic bar.

23. The folding tricycle of claim 21, further comprising a canopy connected with said at least one telescopic bar.

* * * * *